US007721228B2

(12) United States Patent
Burke et al.

(10) Patent No.: US 7,721,228 B2
(45) Date of Patent: May 18, 2010

(54) METHOD AND SYSTEM OF CONTROLLING A CONTEXT MENU

(75) Inventors: Eric Burke, Bloomfield, MI (US); Alan Wada, Mountain View, CA (US); Duke Tsao-Ming Fan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 744 days.

(21) Appl. No.: 10/805,668

(22) Filed: Mar. 18, 2004

(65) Prior Publication Data

US 2005/0039141 A1  Feb. 17, 2005

Related U.S. Application Data

(60) Provisional application No. 60/493,029, filed on Aug. 5, 2003.

(51) Int. Cl.
G06F 3/048 (2006.01)
G06F 3/00 (2006.01)

(52) U.S. Cl. .................. 715/825; 715/810; 715/817; 715/826

(58) Field of Classification Search .......... 715/810, 715/817, 825–826
See application file for complete search history.

(56) References Cited

U.S. PATENT DOCUMENTS

| 5,115,501 | A | * | 5/1992 | Kerr ........................... 707/9 |
| 5,261,042 | A | * | 11/1993 | Brandt ....................... 715/841 |
| 5,345,550 | A | * | 9/1994 | Bloomfield ................. 715/841 |
| 5,367,626 | A | * | 11/1994 | Morioka et al. ............. 715/837 |
| 5,392,386 | A | * | 2/1995 | Chalas ........................ 715/841 |
| 5,499,335 | A | | 3/1996 | Silver et al. |
| 5,581,685 | A | * | 12/1996 | Sakurai ....................... 715/841 |
| 5,598,522 | A | * | 1/1997 | Inatomi ....................... 715/821 |
| 5,625,783 | A | * | 4/1997 | Ezekiel et al. ............... 719/320 |
| 5,630,042 | A | | 5/1997 | McIntosh et al. |
| 5,644,739 | A | * | 7/1997 | Moursund ................... 715/840 |
| 5,659,694 | A | * | 8/1997 | Bibayan ..................... 715/788 |
| 5,664,133 | A | * | 9/1997 | Malamud et al. ............ 715/816 |
| 5,737,557 | A | * | 4/1998 | Sullivan ..................... 715/765 |

(Continued)

FOREIGN PATENT DOCUMENTS

GB  2 366 499 A  3/2002

(Continued)

OTHER PUBLICATIONS

International Preliminary Examination Report for International Application No. PCT/US02/34509; May 11, 2004.

(Continued)

*Primary Examiner*—Steven B Theriault
(74) *Attorney, Agent, or Firm*—James J. DeCarlo; Greenberg Traurig, LLP

(57) ABSTRACT

An embodiment of the invention, for controlling a context menu, used with a Web page, wherein the Web page is divided into regions, can comprise downloading additional menu items that are not part of the context menu prior to download, and monitoring for when a user calls for a context menu. Upon detecting a context menu call, it is determined what region was selected by the user, and at least one of the additional menu items is made available to the user as part of the context menu interface. At least one of the additional menu items is chosen based on the region selected by the user.

61 Claims, 9 Drawing Sheets

U.S. PATENT DOCUMENTS

| | | | |
|---|---|---|---|
| 5,744,787 A | 4/1998 | Teicher | |
| 5,745,115 A * | 4/1998 | Purple et al. | 715/810 |
| 5,760,768 A * | 6/1998 | Gram | 715/747 |
| 5,760,773 A * | 6/1998 | Berman et al. | 715/808 |
| 5,781,724 A | 7/1998 | Nevarez et al. | |
| 5,784,058 A | 7/1998 | LaStrange et al. | |
| 5,796,393 A | 8/1998 | MacNaughton et al. | |
| 5,802,530 A * | 9/1998 | Van Hoff | 715/513 |
| 5,805,803 A | 9/1998 | Birrell et al. | |
| 5,813,007 A | 9/1998 | Nielsen | |
| 5,831,606 A * | 11/1998 | Nakajima et al. | 715/841 |
| 5,848,424 A | 12/1998 | Scheinkman et al. | |
| 5,875,296 A | 2/1999 | Shi et al. | |
| 5,877,759 A | 3/1999 | Bauer | |
| 5,883,810 A | 3/1999 | Franklin et al. | |
| 5,890,172 A | 3/1999 | Borman et al. | |
| 5,914,714 A | 6/1999 | Brown | |
| 5,917,491 A | 6/1999 | Bauersfeld | |
| 5,933,142 A | 8/1999 | LaStrange et al. | |
| 5,949,419 A | 9/1999 | Domine et al. | |
| 5,963,952 A | 10/1999 | Smith | |
| 5,964,836 A | 10/1999 | Rowe et al. | |
| 5,974,446 A | 10/1999 | Sonnenreich et al. | |
| 5,999,179 A | 12/1999 | Kekic et al. | |
| 5,999,972 A | 12/1999 | Gish | |
| 5,999,973 A | 12/1999 | Glitho et al. | |
| 6,000,832 A | 12/1999 | Franklin et al. | |
| 6,006,034 A | 12/1999 | Heath et al. | |
| 6,008,806 A * | 12/1999 | Nakajima et al. | 715/744 |
| 6,009,459 A | 12/1999 | Belfiore et al. | |
| 6,020,884 A | 2/2000 | MacNaughton et al. | |
| 6,025,836 A | 2/2000 | McBride | |
| 6,026,435 A | 2/2000 | Enomoto et al. | |
| 6,034,683 A | 3/2000 | Mansour et al. | |
| 6,041,360 A | 3/2000 | Himmel et al. | |
| 6,049,335 A * | 4/2000 | Iida | 715/811 |
| 6,057,836 A | 5/2000 | Kavalam et al. | |
| 6,061,695 A * | 5/2000 | Slivka et al. | 715/513 |
| 6,072,486 A * | 6/2000 | Sheldon et al. | 715/835 |
| 6,101,486 A | 8/2000 | Roberts et al. | |
| 6,112,240 A | 8/2000 | Pogue et al. | |
| 6,119,098 A | 9/2000 | Guyot et al. | |
| 6,125,352 A | 9/2000 | Franklin et al. | |
| 6,133,915 A * | 10/2000 | Arcuri et al. | 715/779 |
| 6,141,010 A | 10/2000 | Hoyle | |
| 6,160,550 A * | 12/2000 | Nakajima et al. | 715/745 |
| 6,175,869 B1 | 1/2001 | Ahuja et al. | |
| 6,185,600 B1 | 2/2001 | Spence et al. | |
| 6,188,995 B1 | 2/2001 | Garst et al. | |
| 6,208,995 B1 | 3/2001 | Himmel et al. | |
| 6,216,153 B1 | 4/2001 | Vortriede | |
| 6,226,655 B1 | 5/2001 | Borman et al. | |
| 6,226,752 B1 | 5/2001 | Gupta et al. | |
| 6,232,972 B1 | 5/2001 | Arcuri et al. | |
| 6,256,668 B1 | 7/2001 | Slivka et al. | |
| 6,262,731 B1 | 7/2001 | Hasegawa | |
| 6,266,058 B1 | 7/2001 | Meyer | |
| 6,278,450 B1 * | 8/2001 | Arcuri et al. | 715/763 |
| 6,282,548 B1 | 8/2001 | Burner et al. | |
| 6,286,001 B1 | 9/2001 | Walker et al. | |
| 6,292,185 B1 * | 9/2001 | Ko et al. | 715/763 |
| 6,314,451 B1 | 11/2001 | Landsman et al. | |
| 6,360,255 B1 | 3/2002 | McCormack et al. | |
| 6,373,507 B1 | 4/2002 | Camara et al. | |
| 6,384,849 B1 * | 5/2002 | Morcos et al. | 715/810 |
| 6,385,619 B1 | 5/2002 | Eichstaedt et al. | |
| 6,407,754 B1 | 6/2002 | Hetherington et al. | |
| 6,433,800 B1 | 8/2002 | Holtz | |
| 6,434,563 B1 | 8/2002 | Pasquali et al. | |
| 6,460,058 B2 | 10/2002 | Kopolu et al. | |
| 6,469,713 B2 | 10/2002 | Hetherington et al. | |
| 6,476,833 B1 | 11/2002 | Moshfeghi | |
| 6,483,525 B1 | 11/2002 | Tange | |
| 6,486,892 B1 | 11/2002 | Stern | |
| 6,490,602 B1 | 12/2002 | Kraemer | |
| 6,493,000 B1 | 12/2002 | Wynn et al. | |
| 6,493,006 B1 * | 12/2002 | Gourdol et al. | 715/825 |
| 6,496,203 B1 * | 12/2002 | Beaumont et al. | 715/762 |
| 6,496,936 B1 | 12/2002 | French et al. | |
| 6,505,238 B1 | 1/2003 | Tran | |
| 6,542,897 B2 | 4/2003 | Lee | |
| 6,549,217 B1 | 4/2003 | De Greef et al. | |
| 6,584,505 B1 | 6/2003 | Howard et al. | |
| 6,624,831 B1 | 9/2003 | Shahine et al. | |
| 6,651,217 B1 | 11/2003 | Kennedy et al. | |
| 6,689,938 B2 | 2/2004 | Jobs et al. | |
| 6,704,031 B1 | 3/2004 | Kimball et al. | |
| 6,748,367 B1 | 6/2004 | Lee | |
| 6,789,201 B2 | 9/2004 | Barton et al. | |
| 6,810,410 B1 * | 10/2004 | Durham | 709/203 |
| 6,819,343 B1 * | 11/2004 | Sobeski et al. | 715/848 |
| 6,851,060 B1 | 2/2005 | Shrader | |
| 6,865,680 B1 | 3/2005 | Wu at al. | |
| 6,868,394 B1 | 3/2005 | Mele | |
| 6,873,974 B1 | 3/2005 | Schutzer | |
| 6,877,138 B2 * | 4/2005 | Fitzpatrick et al. | 715/769 |
| 7,065,512 B1 * | 6/2006 | Bertrand et al. | 706/45 |
| 7,216,303 B2 * | 5/2007 | Aggarwal et al. | 715/825 |
| 7,246,329 B1 * | 7/2007 | Miura et al. | 715/810 |
| 2001/0001147 A1 | 5/2001 | Hutchison et al. | |
| 2001/0029527 A1 * | 10/2001 | Goshen | 709/218 |
| 2001/0035885 A1 | 11/2001 | Iron et al. | |
| 2002/0018078 A1 | 2/2002 | Khan et al. | |
| 2002/0057299 A1 * | 5/2002 | Oren et al. | 345/825 |
| 2002/0062342 A1 | 5/2002 | Sidles | |
| 2002/0070963 A1 * | 6/2002 | Odero et al. | 345/739 |
| 2002/0070969 A1 | 6/2002 | Barksdale et al. | |
| 2002/0075326 A1 | 6/2002 | Allen | |
| 2002/0077978 A1 | 6/2002 | O'Leary et al. | |
| 2002/0078095 A1 | 6/2002 | Culham | |
| 2002/0085224 A1 | 7/2002 | Price et al. | |
| 2002/0089549 A1 | 7/2002 | Munro et al. | |
| 2002/0097277 A1 | 7/2002 | Pitroda | |
| 2002/0107807 A1 * | 8/2002 | Ketonen et al. | 705/51 |
| 2002/0118220 A1 * | 8/2002 | Lui et al. | 345/709 |
| 2002/0135561 A1 * | 9/2002 | Rojewski | 345/156 |
| 2002/0149615 A1 | 10/2002 | Rajarajan et al. | |
| 2002/0149618 A1 | 10/2002 | Estrada et al. | |
| 2002/0154159 A1 | 10/2002 | Day et al. | |
| 2002/0158912 A1 | 10/2002 | O'Rourke | |
| 2002/0163544 A1 | 11/2002 | Baker et al. | |
| 2002/0163545 A1 | 11/2002 | Hii | |
| 2002/0175955 A1 | 11/2002 | Gourdol et al. | |
| 2002/0175995 A1 | 11/2002 | Sleeckx | |
| 2002/0186239 A1 | 12/2002 | Komuro | |
| 2002/0186249 A1 | 12/2002 | Lu et al. | |
| 2002/0186255 A1 | 12/2002 | Shafron et al. | |
| 2002/0186256 A1 | 12/2002 | Hong | |
| 2002/0186257 A1 * | 12/2002 | Cadiz et al. | 345/838 |
| 2003/0009768 A1 | 1/2003 | Moir | |
| 2003/0011641 A1 | 1/2003 | Totman et al. | |
| 2003/0028764 A1 | 2/2003 | Campbell | |
| 2003/0063126 A1 * | 4/2003 | Yanchar et al. | 345/781 |
| 2003/0067481 A1 | 4/2003 | Chedgey et al. | |
| 2003/0080995 A1 | 5/2003 | Tenenbaum et al. | |
| 2003/0085916 A1 | 5/2003 | Thiry et al. | |
| 2003/0085927 A1 | 5/2003 | Muller | |
| 2003/0112271 A1 | 6/2003 | Batalden et al. | |
| 2003/0112280 A1 | 6/2003 | Driskell | |
| 2003/0128233 A1 | 7/2003 | Kasriel | |
| 2003/0131106 A1 | 7/2003 | Kasriel | |
| 2003/0164862 A1 * | 9/2003 | Cadiz et al. | 345/838 |
| 2003/0174154 A1 * | 9/2003 | Yukie et al. | 345/700 |
| 2003/0202009 A1 | 10/2003 | Kasriel | |

| | | | |
|---|---|---|---|
| 2003/0222923 | A1* | 12/2003 | Li .................................. 345/815 |
| 2004/0061720 | A1* | 4/2004 | Weber ........................ 345/760 |
| 2004/0125130 | A1 | 7/2004 | Flamini et al. |
| 2004/0174396 | A1* | 9/2004 | Jobs et al. .................... 345/810 |
| 2004/0186775 | A1 | 9/2004 | Margiloff et al. |
| 2004/0189695 | A1* | 9/2004 | Kurtz et al. .................. 345/738 |
| 2004/0212617 | A1* | 10/2004 | Fitzmaurice et al. ........ 345/440 |
| 2004/0212640 | A1* | 10/2004 | Mann et al. .................. 345/792 |
| 2004/0243520 | A1 | 12/2004 | Bishop et al. |
| 2005/0039144 | A1 | 2/2005 | Wada et al. |
| 2005/0060655 | A1* | 3/2005 | Gray et al. .................... 715/745 |
| 2005/0086636 | A1* | 4/2005 | Sobeski et al. .............. 717/103 |
| 2005/0097511 | A1* | 5/2005 | Bergman et al. ............ 717/110 |
| 2005/0198220 | A1 | 9/2005 | Wada et al. |
| 2006/0036966 | A1* | 2/2006 | Yevdayev ..................... 715/779 |
| 2006/0123356 | A1* | 6/2006 | Sobeski et al. .............. 715/781 |
| 2006/0190441 | A1* | 8/2006 | Gross et al. ..................... 707/3 |

FOREIGN PATENT DOCUMENTS

| | | |
|---|---|---|
| GB | 2366499 | 3/2002 |
| WO | 00/25239 | 5/2000 |
| WO | WO 00/25239 | 5/2000 |
| WO | WO 00/31657 A2 | 6/2000 |
| WO | 00/70500 | 11/2000 |
| WO | 01/06409 | 1/2001 |
| WO | WO 01/39046 A1 | 5/2001 |
| WO | WO 01/67285 A2 | 9/2001 |
| WO | WO 01/95104 | 12/2001 |
| WO | 02/31685 | 4/2002 |
| WO | WO 01/38554 | 5/2003 |
| WO | WO 03/038640 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

International Preliminary Examination Report for International Application No. PCT/US02/34510; Aug. 12, 2004.
International Search Report for International Application No. PCT/US04/24397; Oct. 31, 2005.
Written Opinion for International Application No. PCT/US04/24397; Oct. 31, 2005.
International Preliminary Report on Patentability for International Application No. PCT/US2004/024397; Feb. 13, 2006.
Hauser, "Generic Extensions of WWW Browsers", First USENIX Workshop on Electronic Commerce; Aug. 10, 1995; pp. 147-154.
"Band Objects", Microsoft Corporation, Copyright 1997.
"Browser Extensions", MSDN, Copyright 2004, http://msdn.microsoft.com/library/default.asp?url=/workshop/browser/ext/overview/overview.asp.
"Creating Custom Explorer Bars, Tool Bands, and Desk Bands", MSDN, Copyright 2004, http://msdn.microsoft.com/library/default.asp?url=/library/en-us/shellcc/platform/Shell/programmersguide/shell_adv/bands.asp.
"Developers Get Early IE 5", Wired News, Jun. 11, 1998, http://www.wired.com/news/print/0,1294,12936,00.html.
"Introduction", XUL Programmer's Reference Manual, Last Updated: Apr. 5, 2001, http://www.mozilla.org/xpfe/xulref/.
"Netscape 6 Preview Release 1", NT Compatible, Apr. 5, 2000, http://www.ntcompatible.com/story322.html.
"Plug-in Guide", DevEdge Online Documentation, Jan. 1998, Chapter 1, http://developer.netscape.com/docs/manuals/communicator/plugin/index.htm.
"Subject: Add toolbar to IE4-taskbar", Google Groups, Jan. 26, 1999, http://groups.google.com/groups?hl=en&lr=&ie=UTF-8&oe=UTF-8&threadm=36ae2a57.3471779%40news.uni-stuttgart.de&rnum=9&prev=/groups%3Fhl%3Den%261r%3D%26ie%3DUTF-8%26oe%3DUTF-8%26q%3Dtoolbar%2Bin%2Bie4.
"Subject: Adding Toolbar (Plugin) in Netscape Communicator ", Google Groups, May 18, 2000, http://groups.google.com/groups?hi=en&lr=&ie=UTF-8&oe=UTF-8&threadm=8gp8t5%241ab1%40secnews.netscape.com&rnum=23&prev=/groups%3Fq%3Dcustom%2Btoolbars%2Bin%2Bnetscape%2B6%26start%3D20%26hl%3Den%261r%3D%26ie%3DU
"Subject: Custom Toolbar for Netscape Browser", Google Groups, May 15, 2001, http://groups.google.com/groups?hl=en&lr=&ie=UTF-8&oe=UTF-8&threadm=3B0177FD.BE89042B%40univ.ox.ac.uk&mum=2&prev=/groups%3Fhl%3Den%26Ir%3D %26ie%3DUTF-8%26oe%3DUTF-8%26q%3Dcustom%2Bnetscape%2B6%2Btoolbar%2B-button%2B-personal.
"Subject: How The Hell ???? ", Google Groups, Jun. 6, 2000, http://groups.google.com/groups?hl=en&lr=&ie=UTF-8&oe=UTF-8&4threadm=8hln7u%24fb53%40secnews.netscape.com&rnum=11&prev=/groups%3Fq%3Dadding%2Btoolbar%2Bin%2Bnetscape%2B6%26start%3D10%26hl%3Den%26Ir%3D%26ie%3DUTI
"Subject: How to add toolbar like Yahoo companion in IE", Google Groups, Sep. 30, 1999, Messages 1-10, http://groups.google.com/groups?h1=en&lr=&ie=UTF-8&oe=UTF-8&threadm=OWlmH%246C%24GA.227%40cppssbbsa02.microsoft.com&rnum=88&prev=/groups%3Fq%3Dtoolbar%2Bin%2Bie4%26hl%3Den%26Ir%3D%26ie%3DUTF-8%26oe%3DUTF-8-8
"Subject: How to add toolbar like Yahoo companion in IE", Google Groups, Sep. 30, 1999, Messages 11-14, http://groups.google.com/groups?hl=en&lr=&ie=UTF-8&oe=UTF-8&threadm=7tdbfa%247j9%241%40nnrp1.deja.com&mum=2&prev=/groups%3Fhl%3Den%26ie%3D UTF-8%26oe%3DUTF-8%26q%3Dtool%2Bband%2Bin%2Bie4%26spell%3D1.
"Subject: IE4 Band Objects", Google Groups, Mar. 22, 1998, http://groups.google.com/groups?hl=en&lr=&ie=UTF-8&oe=UTF-8&threadm=3524f417.0%40news1.cityweb.de&rnum=1&prev=/groups%3Fhl%3Den%26Ir%3C%26ie %3DUTF-8%26oe%3DUTF-8%26q%3D%2522communication%2Bbands%2522%2Bie4.
"Subject: Plugins for IE", Google Groups, Sep. 30, 2000, http://groups.google.com/groups?hl=en&lr=&oe=UTF-8&oe=UTF-8&threadm=Ojkp2jxLAHA.243%40cppssbbsa04&mum=24&prev=/groups%3Fq%3Dplugin%2Bgroup: microsoft.public.inetexplorer.ie4.activex_contrl%26hl%3Den%261r%3D%26ie%3DUTF-8%26oe%3DUTF-8%26group%3Dmicrosoft.public.inetexplorer.ie4.activex_contrl%26start%3D20%26sa%3DN.
"Subject: Toolbar like IE4", Google Groups, Apr. 23, 1998, http://groups.google.com/groups?h1=en&lr=&ie=UTF-8&oe=UTF-8&,threadm=eyzHG4qb9GA.136%40uppssnewspub05.moswest.msn.net&mum=6&prev=/groups%3F hl%3Den%261r%3D%26ie%3DUTF-8%26oe%3DUTF-8%26q%3Dtoolbar%2Bin%2Bie4.
"Subject: Whats the deal with Yahoo Companion? Standard plugin API or not?", Google Groups, Jan. 12, 2000, http://groups.google.com/groups?hl=en&lr=&8de=UTF-8&oe=UTF-8&threadm=387D225C.E3796E7C%40sympatico.ca&rnum=2&prev=/groups%3Fhl%3Den%261r%3D %26ie&3DUTF-8%26oe%3DUTF-8%26q%3Dcustom%2Btoolbar%26btnG%3DGoogle%2BSearch%26meta%3Dgroup%253Dr
Berst, Jesse, "A Must-See Browser Add-On," ZDNet AncorDesk. Sep. 16, 1998. http://www.zdnet.com/anchordesk/story/story_2543.html.
Alex, "Alexa Accessorizes Browsers," CNET News.com. Sep. 22, 1997. http://news.com.com/2100-1001-203484.html.
Eisenberg, Bart, "Alexa Archives the Internet," Copyright 1997. http://www.gihyo.co.jp/magazine/SD/pacific/SD_9711.html.
"As Go Surfers, So Goes Alexa". Wired News. Jul. 24, 1997. http://www.wired.com/news/technology/0,1282,5427,00.html.
"Client/Server and Host Application Development Tools", DBMS, v9, n6, p. 27(10), Jun. 15, 1996.
Alexa Internet Website. Archived Feb. 9, 1998 at http://web.archive.org.
Alwang, Greg, "Meeting of the Minds", PC Magazine, v17, n4, p. 179(10), Feb. 24, 1998.
Childers, Mark, "Delphi Client/Server Suite", PC Magazine, v15, n1, p. 207(3), Sep. 10, 1996.

Evans, Nick, "Extend Client/Server Apps to the Web", Data Based Advisor, v15, n3, p. 52(5), Mar. 1997.

Faison, "The New HTML Help System Extends Online Help From the Desktop to the Web", Microsoft Systems Journal, v13, n1, p. 55(14), Jan. 1998.

Finn, Mike, "Add Control to your Intranet", Databased Web Advisor, v15, n8, p. 56(3), Aug. 1997.

Flanagan, David, "Netscape 6.0 Released", O'Reilly, Nov. 16, 2000, http://www.oreillynet.com/pub/a/oreilly/news/flanagan3_1100.html.

Galli, Marcio, "The DevEdge RSS-News Ticker Toolbar", Netscape DevEdge, Jul. 14, 2003, http://devedge.netscape.com/viewsource/2003/rss-toolbar-ticker/.

International Preliminary Examination Report for International Application No. PCT/US01/16993, Mar. 5, 2003.

International Preliminary Examination Report for International Application No. PCT/US99/25332, Jul. 29, 2002.

International Search Report for International Application No. PCT/US01/16993, Oct. 25, 2001.

International Search Report for International Application No. PCT/US02/34509, Oct. 28, 2003.

International Search Report for International Application No. PCT/US02/34510, Jan. 31, 2003.

International Search Report for International Application No. PCT/US99/25332, Feb. 2, 2000.

Written Opinion for International Application No. PCT/US02/34510, Sep. 26, 2003.

Jimmy, "Netscape 6.0 Preview Release 2 Review—Good Software, Bad Timing", Jimmy's World, Aug. 9, 2000, http://www.jimmysworld.org/opinions/netscape-6.0-pr2.html.

Mace, Thomas, "PowerBrowser", PC Magazine, vol. 15, No. 5, p. 132(1), Mar. 12, 1996.

Mann, Alex and Hecht Kevin, "DevEdge Newsgroup FAQ: Client Technical", DevEdge Online Archive, Last Updated: Dec. 15, 1998, http://developer.netscape.com/support/faqs/champions/client_tech.html.

Mendelson, Edward, "Wake Up Your Web Site", Pc Magazine, vol. 17, No. 11, pg. 60(2), Jun. 9, 1998.

Persky, James, "HTML goes WYSIWYG: Two Mac-based Editors", LAN Magazine, v12, n3, p. 121(5), Mar., 1997.

Roberts, Scott, "Programming. Microsoft Internet Explorer 5", Jul. 1999, pp. 3-16, 383-423, 461-475, Microsoft Press, USA.

Summers, Jason, "Plug-ins Newsgroup FAQ: Plug-ins", DevEdge Online Archive, Last Updated: May 26, 1999, http://developer.netscape.com/support/faqs/plugins/general.html.

Trupin, Joshua, "The Visual Programmer puts Active X Document Objects Through Their Paces", Microsoft Systems Journal, v11, n6,. P. 55(16), Jun. 1996.

Ladd, Eric and O'Donnell, Jim, "Using Microsoft Internet Explorer 4," Que Corporation. 1997. pp. 42 and 43.

Walter, Mark, "Acrobat 4: Adobe's Bid to Make it More than Just a Viewer", Seybold Report on Internet Publishing, 3, 7, NA(1), Mar. 1999.

Wong, William, "Meeting on the Internet in 10 Minutes", Network, v12, n12, p. 131(4), Nov. 1997.

Alexa, Alexa Toolbar Version 1.4.1, Copyright 1998, [Note: Setup File Available on Enclosed CD in Folder Entitled "Alexa Setup," also available at http://ftp3.ruireebsd.org/pub/pc/windows/WinSock/IE/ at hyperlink alexaSetup14m.exe.

Supplementary Partial Euorpean Search Report (EP 04 75 7365).

Supplemental European Search Report (EP 04757365.4) dated Nov. 28, 2008.

* cited by examiner

100

600

700

800

900

METHOD AND SYSTEM OF CONTROLLING A CONTEXT MENU

CROSS-REFERENCE TO RELATED APPLICATION

This application claims the benefit of U.S. Provisional Application Ser. No. 60/493,029, filed Aug. 5, 2003, entitled METHOD AND SYSTEM OF CONTROLLING A CONTEXT MENU, which is hereby incorporated herein by reference.

BACKGROUND OF THE INVENTION

1. Field of the Invention

The present invention is directed to computer interfaces and, more particularly, to a method and system of controlling a context menu.

2. Description of Related Art

When accessing the Internet (i.e., the worldwide Web, the Web, etc.), an Internet user typically executes, via a computer, a browser software program such as, for example, Netscape Navigator™ or Microsoft Internet Explorer™. The browser program (i.e., a browser) establishes a link to the Internet (via a modem and an Internet Service Provider (ISP), for example) and also provides a textual and graphical user interface (i.e., an application window) and a window within the application window for displaying Internet content (i.e., a browser window).

While using the browser program, a user is able to call up a context menu, e.g., by clicking on the right mouse button or activating a context menu key. The context menu is comprised of a list of items that can be chosen, typically, to perform different browser functions. Different context menus are displayed depending on what was clicked on and/or selected by the user in the browser program. The context menu gives a user quick access to browser functions that are related to the element that was clicked, making Internet navigation more convenient. For these reasons, it is often desirable to insert additional menu items to a context menu that add functionality to the browser program.

Current browser programs allow an application to add text, and to associate handlers with the text, in context menus, by modifying registry settings. This method of modifying context menus, however, has several shortcomings. One such shortcoming is that, with this method, the application has no control over the order and position of the additional items relative to standard or other menu items in the context menu. Another shortcoming of current context menu modification techniques is that they offer the same menu items regardless of the user using the browser, and regardless of the country, etc., in which the user is located during use of the browser. Still another shortcoming is that updating or changing context menu items requires the user to install a new application at the user computer. As such, a need exists for an improved system and method of controlling a context menu.

SUMMARY OF THE INVENTION

The invention satisfies these and other needs, as will be apparent from the teachings herein. An embodiment of the invention, for controlling a context menu, can comprise downloading additional menu items that are not part of the context menu prior to download, and monitoring for when a user calls for a context menu. Upon detecting a context menu call, it is determined what region was selected by the user, and at least one of the additional menu items is made available to the user as part of the context menu interface.

Another embodiment of the invention is directed to a method of controlling a context menu provided by a company, used with a Web page. The method comprises downloading additional menu items that are not part of the context menu prior to download, and monitoring, via a client-side module, for when a user calls for a context menu. Upon detecting a context menu call, at least one of the additional menu items is made available to the user as part of the context menu interface, and the placement of the additional menu items is determined by the client-side module.

Another embodiment of the invention is directed to a method of controlling a context menu, used with a Web page, and comprises downloading additional menu items and menu icons, via a client-side module, that are not part of the context menu prior to download, and monitoring for when a user calls for a context menu. Upon detecting a context menu call, at least one of the additional menu items is made available to the user as part of the context menu interface, and at least one of the icons are placed adjacent to at least one of the additional menu items.

Other objects and features of the present invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method of controlling a context menu.

Figure 1:
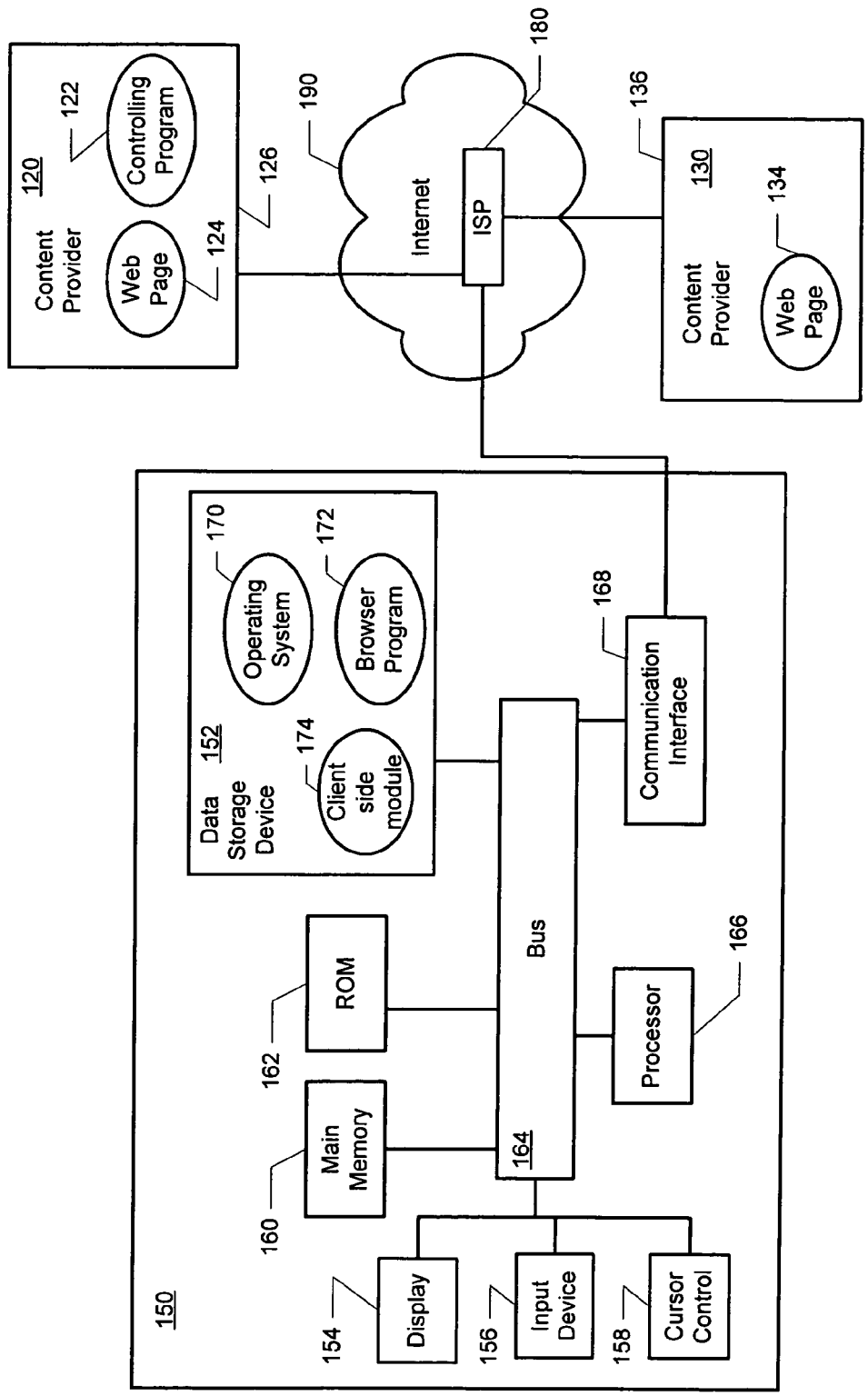
FIG. 1 is a schematic illustrating a system implemented according to an embodiment of the present invention.

With reference to FIG. 1, there is shown a block diagram of a system 100 implemented in accordance with certain embodiments of the invention. A computer 150 is connected to the Internet 190. Computer 150 comprises an internal bus 164 that facilitates communication of information (i.e., digital data) between and among the various devices of the computer 150 and that also facilitates communication between the computer and external devices and systems via a communication interface 168. A processor 166 coupled to the bus 164 processes information within the computer 150. The computer 150 also includes a memory 160 such as, for example, Random Access Memory (RAM) and/or other equivalent dynamic memory storage devices, coupled to bus 164 for receiving and storing instructions communicated from the processor 166. Memory 160 may also be used to temporarily store variable or other intermediate information while the processor 166 executes instructions. Read-Only-Memory (ROM) 162 is also coupled to the bus 164 for storing static data and instructions for use by the processor 166.

Various input and output devices are provided as part of computer 150, including, by way of non-limiting example, a display 154 (e.g., cathode ray tube (CRT), liquid crystal display (LCD), etc.), an input device 156 such as a keyboard, and a cursor control device 158 such as a mouse, or trackball, for example. A data storage device 152 such as, for example, a magnetic disk drive and magnetic disk, a CD-ROM drive and CD-ROM, or other equivalent devices and data storage mediums, is coupled to the bus 164 for communication with the processor 166, main memory 160, and communication interface 168. The storage device 152 preferably has an operating system 170 and an Internet browser software program 172 (i.e., a browser) stored thereon. As will be discussed in greater detail below, a client-side module 174 may also be stored on the data storage device 152.

The computer 150 may communicatively connect to the Internet 190 via the communication interface 168 over one or more transmission media including, but not limited to, coaxial cable, copper wires, and fiber optical cables. Communication between the computer 150 and the Internet 190 may also be via a wireless or cellular interface. The communication interface 168 facilitates two-way communication between the computer 150 and another electronic device or system, e.g., a server computer (not shown) provided by a content provider 120, 130.

An Internet user (not shown) using the computer 150 may gain access to the Internet 190 by causing the browser 172 to execute, thereby opening a communication link between the communication interface 168 of the computer 150 and an Internet site 126 of content provider 120, via an Internet Service Provider (ISP) 180. Internet content is communicated by the content provider 120 to the computer 150 for display by browser 172. Alternatively, a content provider 120, 130 may also be and ISP 180.

In alternative embodiments, computer 150 may be a desktop or notebook computer, PDA, hand held device, or wireless phone (with graphics capability), or any other device now known or hereafter developed that is capable of performing the functions as described herein.

In accordance with an embodiment of the invention, a first Internet content provider 120 may provide an Internet user with access to a program 122 for controlling the browser 172. When executed by the user, the controlling program 122 downloads or creates a client-side module 174 such as, for example, a Dynamic Link Library (DLL), on the data storage device 152 of the Internet user's computer 150. The client-side module 174 preferably includes ActiveX control or Plug-in functionality. Thereafter, when the Internet user accesses the Internet using the browser 172, the browser 172 opens the client-side module 174 and preferably automatically (or otherwise) establishes a connection to the content provider's Internet site 126. The content provider, in response to the connection established by the browser 172, loads information and/or functional data into a shell operating within the browser and created by the client-side module 174. For example, if the user has an account with the content provider 120, customized information and/or functionality may be loaded into the client-side module 174. If the user does not have an account, more generalized (e.g., guest) information and/or functionality may be loaded.

In certain embodiments, the client-side module 174 essentially opens a shell (or a plurality of shells) within the browser 172 that contains the ActiveX control or Plug-in code that may control, i.e., add, remove, and/or modify, the Internet browser 172. When loaded with the ActiveX control or Plug-in, the client-side module 174 preferably contains functions, objects, data, and other software, referred to generally herein as information, that may be used to control the browser 172. The present embodiment ensures that the client-side module 174 (and shell) does not close when the Internet user moves, for example, from Internet site 126 (having a Web page 124) to Internet site 136 (having Web page 134). Thus, the information and/or functionality provided via the ActiveX control or Plug-in is not lost when the Internet user disconnects from the Internet site that loaded the ActiveX control or Plug-in, and connects to another Internet site. In alternate embodiments the client-side module 174 may operate "behind" the browser, and appear invisible to the user until a context menu is called. Still in other embodiments, client-side module 174 may be located at a remote location from the Internet user.

Figure 2:
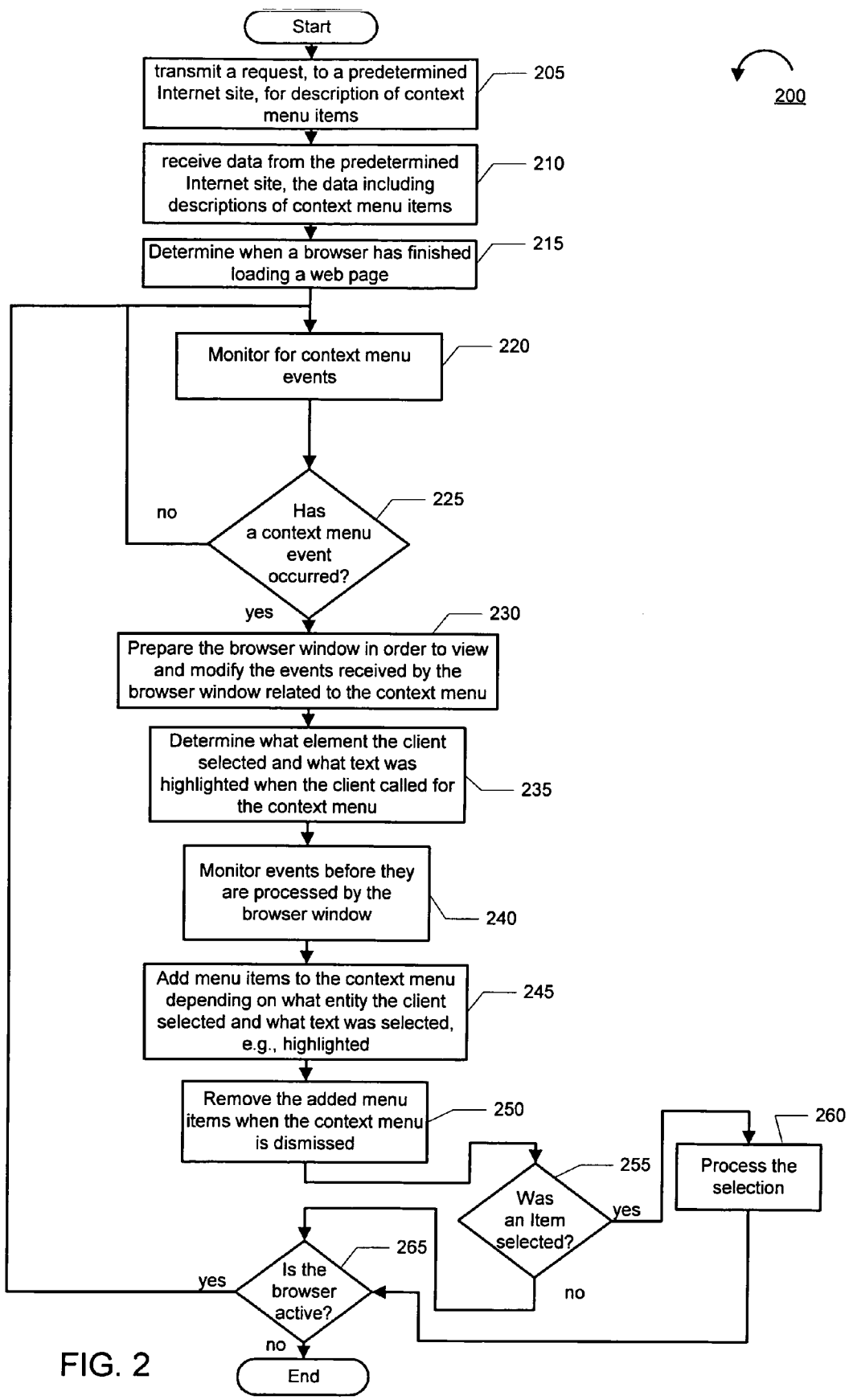
FIG. 2 is a flowchart illustrating the process of controlling a context menu according to an embodiment of the present invention.

FIG. 2 illustrates an exemplary embodiment of a method 200 for controlling a context menu. The method 200 starts with step 205 with the client-side module 174 transmitting a request to a predetermined Internet site, e.g., content provider 120, where the request is received, for a description of the context menu items. This request can be part of and/or implied in the connection established between the client-side module 174 and the content provider's Internet site 126 as mentioned above.

Next, in step 210, the client-side module 174 receives data from the predetermined Internet site 126, the data including descriptions of context menu items. In one exemplary example, wherein the method of controlling a context menu is implemented with a client-side module 174 for a browser toolbar, the context menu item descriptions are received by the client in the same feed as the regular buttons of the toolbar. The description can include, for example, types, URLs, tiles, mnemonic keys and start positions.

Processing proceeds from step 210 to step 215, where the client-side module 174 determines when the browser 172 has finished loading a Web page. This may be done, in one exemplary embodiment, by coordinating events on the Web browser control so that the Web browser notifies the client-side module 174 when different events happen. For example, when a Web page is complete, the client-side module 174 will receive a DISPID_DOCUMENTCOMPLETE event.

Returning to the description of method 200, in step 220, the client-side module 174 monitors for context menu events. In one exemplary embodiment, after a Web page is finished loading, the client-side module 174 retrieves the IHTMLDocument2 interface for the page. Using an IHTMLDocument2 pointer, the client-side module 174 can monitor events that are related to the HTML document. In particular, the client-side module 174 looks for the event called DISPID_HTMLDOCUMENTEVENTS2_ONCONTEXTMENU, which is initiated, or in the computer programming vernacular, "fired" when the user clicks or activates the right mouse button (or other appropriate selector) when the cursor is positioned in the browser window.

Next, the client-side module 174 determines if a context menu event occurred, in step 225. If no context menu event occurs, processing returns to step 220, where the client-side module 174 continues to monitor for context menu events. Returning to decision step 225, if the client-side module 174 determines that a context menu event has occurred, e.g., a DISPID_HTMLDOCUMENTEVENTS2_ONCONTEXTMENU event occurs, processing proceeds to step 230.

In step 230, the client-side module 174 prepares the browser window to view and possibly modify the events received by the browser window related to the context menu. In a certain embodiment, when the client-side module 174 detects a DISPID_HTMLDOCUMENTEVENTS2_ONCONTEXTMENU event, the client-side module 174, subclasses the browser window. Subclassing the browser window allows the client-side module 174 to view the events received by the browser window. Subclassing may be performed, for example, by using a CContainedWindow object that directs messages to the client-side module 174. To determine which window the client-side module 174 will subclass, the client-side module 174 walks down the window hierarchy starting at the top level browser window looking for a window with the classname of "Internet Explorer_Server." Once identified, that window will be subclassed. Browser window subclassing of this type is described in further detail in U.S. patent application Ser. No. 09/429,585, filed Oct. 28, 1999, and entitled "A Method Of Controlling An Internet Browser Interface And A Controllable Browser Interface," the contents of which are hereby incorporated by reference herein.

Returning to the description of method 200, in step 235, the client-side module 174 determines what element on the Web page the client selected, and what text (if any) was highlighted when the client called for, or activated, the context menu. Step 235 is described in greater detail below with respect to method 300 and with reference to FIG. 3. Referring back to FIG. 2, after step 235, the client-side module 174 will have obtained information related to the selected element, including the type of the element, which may be a combination of at least an anchor (e.g., a clickable hyperlink), an object (e.g., an ActiveX control embedded on the Web page), an image (e.g., a picture embedded on the page), and text; the URL that was selected, if any; and what text was selected (or highlighted) at the time, if any. With the element information, selected text and having prepared the browser window in step 230, processing proceeds to step 240.

In step 240, the client-side module 174 monitors events before they are processed by the browser window. In one exemplary embodiment, the client-side module 174 looks for messages including the messages WM_INITMENU, WM_EXITMENULOOP, WM_MENUCHAR, WM_MENUSELECT, WM_MEASUREITEM, and WM_DRAWITEM.

When a message indicating the context menu is about to be displayed is received by the client-side module 174, processing proceeds from monitoring step 240 to step 245, where the client-side module 174 adds menu items to the context menu based upon what element, if any, the client selected and what text, if any, was selected. In one exemplary embodiment, a WM_INITMENU message indicates that a context menu is about to be displayed. When the client-side module 174 receives a WM_INITMENU message, the client-side module 174 identifies the type of the element that was selected so that the client-side module 174 can determine where in the context menu to place the additional menu items. In certain embodiments, the starting position for each type of element is predetermined and is included in the context menu item description received from the predetermined Internet site. If an element has more than one type, the order of precedence is Anchor, Image, Text (e.g., if type is Anchor and Image, the client-side module 174 starts at the Anchor starting position). In alternate embodiments, different orders of precedence, or no particular order of precedence, may be employed. Once the client-side module 174 determines the starting position, the client-side module 174 adds menu items to the context menu using, in certain embodiments, Windows Application Programming Interfaces (APIs). If there were one or more mnemonic characters in the received context menu descriptions, the client-side module 174 stores the mnemonic characters when the client-side module 174 adds the menu item. Furthermore, the additional or original context menu items can also include submenus. For example, when a user floats a pointer over and/or selects the additional or original context menu item, a second context menu, giving a user additional menu items, can be created. In addition, alternatively, an item on the second context menu can also lead to a third context menu, and so on. Such submenus could be employed to help organize related items.

When a message indicating the context menu is dismissed is received, e.g., the client chooses a menu item or clicks somewhere outside the context menu, processing proceeds from step 245 to step 250, where the client-side module 174 removes the added menu items from the context menu. In a certain embodiment, a WM_EXITMENULOOP message indicates that a context menu is dismissed. When the client-side module 174 receives a WM_EXITMENULOOP message, the client-side module 174 removes the added context menu items.

In one exemplary embodiment if the client-side module 174 receives a WM_MENUCHAR message, this would indicate that the client had hit, or depressed, a keyboard key while the context menu was displayed. In this case, the client-side module 174 compares the key that was hit to the mnemonic keys (with the comparison being case insensitive) of the context menu items that were added. If there is a match, the context menu is dismissed, and a WM_MENUSELECT message is sent to the client-side module 174 with values that indicate to the client-side module 174 that the context menu was dismissed.

Returning to the description of method 200, processing proceeds from step 250 to decision step 255. In step 255, the client-side module 174 determines if an item was selected. In one exemplary embodiment, a WM_MENUSELECT message indicates that a user either hit a mnemonic key corresponding to a menu item or made a selection with the mouse. A WM_MENUSELECT message can also indicate when a user drags the mouse to point at a menu item, e.g., so that the menu item can be highlighted.

If the client-side module 174 determines that a selection was made, then processing proceeds from step 255 to step 260, where the selection is processed. When a WM_MENUSELECT message is received with a parameter indicating that the context menu has been dismissed, and the user chose a context menu item either by mouse or by keystroke (or otherwise), then a selection was made and it is processed. In one embodiment, the client-side module 174 looks at the context menu items description for the data that corresponds to the item selected. From this data, the client-side module 174 substitutes the default URL with data that is specific to the current Web page, such as the URL or text selection. Once the information is substituted, it is processed.

Returning to decision step 255, if it is determined that a context menu item was not selected, processing proceeds to step 265. In step 265, the client-side module 174 determines if the browser is still active. If the browser is active, processing returns to step 220 and the client-side module 174 monitors for context menu events. If, on the other hand, the client-side module 174 determines that the browser is no longer active, processing of method 200 is terminated.

Figure 3:
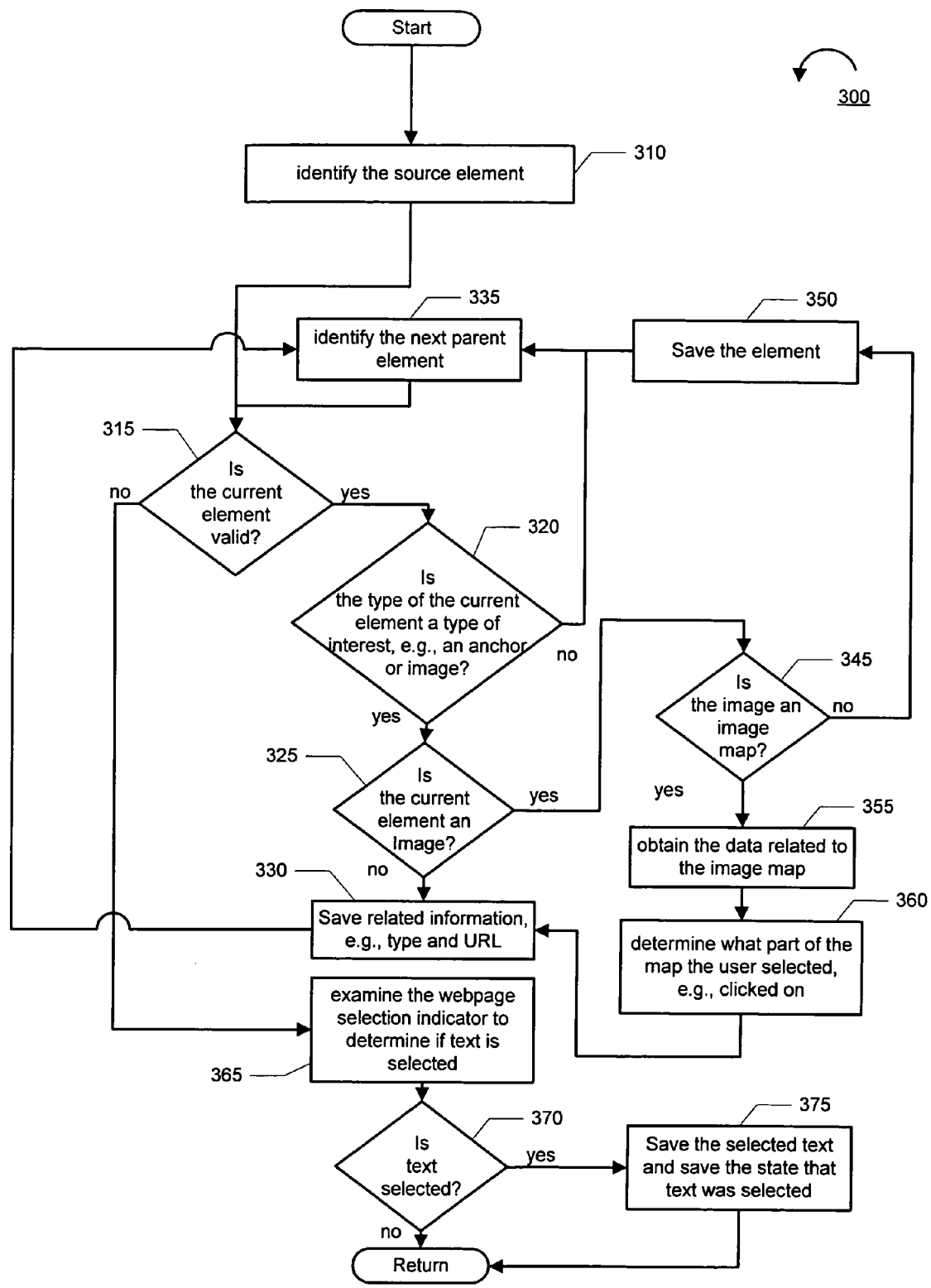
FIG. 3 is a flowchart illustrating the process of determining what element a user selected according to an embodiment of the present invention.

Turning to FIG. 3, with continued reference to FIG. 1, there is shown an exemplary embodiment of the method 300, for determining what element the user selected and what text was selected when the user called for the context menu. Processing of method 300 begins at step 310, where the client-side module 174 identifies the element on the Web page that was selected by the user. This element is considered to be the source element. In an embodiment, the client-side module 174 can identify the source element by using the IHTMLEventObj pointer that corresponds to the selection (e.g., click), in question. This pointer contains information about the click event, including what HTML element was selected (clicked on). Processing then proceeds from step 310 to step 315.

In step 315, the client-side module 174 determines if the current element is valid. In certain embodiments, the client-side module 174 determines if the current element is an Anchor, Object, or Image by using ATL smart pointer CComQIPtr<Class>. For example, to test the element as an ANCHOR, the client-side module 174 can use the following call:

CComQIPtr<IHTMLAnchorElement>pAnchor=pElem;

If this call succeeds and pAnchor is not NULL, i.e., has a value, the client-side module 174 determines that the element is an ANCHOR. Similar processes are used to determine if an element is an Object or an Image. Returning to method 300, if, in step 315, the client-side module 174 determines the current element is valid, processing proceeds to step 320, where the client-side module 174 determines if the type of the element is a type of interest, for example, in one embodiment of the present invention, anchor and image type are of interest. In other embodiments, other types such as Object and Text may also be of interest and addition context menu items may be added giving a user additional functionality.

In step 320, if the client-side module 174 determines the type of the current element is not of interest, processing proceeds to step 335, where the client-side module 174 walks up the Web page (e.g., HTML document), structure and identifies the next parent element, i.e., the preceding element. Processing proceeds from step 335 to decision step 315, where the client-side module 174 determines if the current element is valid. If the current element is valid, processing proceeds from step 315 to step 320. In step 320, if the client-side module 174 determines the type of the current element is a type of interest, proceeding proceeds from step 320 to step 325.

In step 325 the client-side module 174 determines if the current element is an image. If the client-side module 174 determines that the current element is not an image processing proceeds to step 330, where the client-side module 174 saves the element, including related information (e.g., the type of the element and the associated URL). From step 330, processing returns to step 335, where the next parent is identified. Steps 315 and 320 are repeated as described above. In step 325, if the client-side module 174 determines the current element is an image, processing proceeds to step 345.

In step 345, the client-side module 174 determines if the image is an image map. As is known to those skilled in the art, an image map is an image that is subdivided into clickable areas that can each map to different URLs when clicked. The URL can be a bookmark into the current page, or a link to another Web page. In certain embodiments, the client-side module 174 looks at the "useMap" property of the image element. If the value of the property is blank, e.g., " ", the image is not an image map. If the "useMap" property of the image is a URL, then the image is an image map. Returning to step 345, if the client-side module 174 determines the image is not an image map, processing proceeds to step 350, where the current element is saved. From step 350, processing proceeds to step 355, where the next parent element is identified. Steps 315, 320, and 325 are repeated as described above.

Returning to step 345, if the client-side module 174 determines the image is an image map, processing proceeds to step 355, where the client-side module 174 obtains the data related to the image map. In one exemplary embodiment, the image map data is stored as a set of coordinates and URLs, e.g.:

```
<MAP NAME="map1">
<AREA NAME="area1" COORDS="0,0,99,100"
    HREF="http://www.yahoo.com/" TARGET="frame1">
<AREA NAME="area2" COORDS="100, 0,199, 100"
    HREF="http://sports.yahoo.com/" TARGET="frame1">
<AREA NAME="area3" COORDS="200,0,299,100"
    HREF="http://weather.yahoo.com/" TARGET="frame1">
<AREA NAME="area4" COORDS="300,0,400,100"
    HREF="http://companion.yahoo.com/" TARGET="frame1">
</MAP>
```

The COORDS describe the bounding rectangle of that map area and the HREF is the URL that the browser will navigate to when the user clicks in the described area. This image map information is stored for later use.

Returning to the description of method 300, processing proceeds from step 355 to step 360. In step 360, the client-side module 174 determines what part of the map the user selected, (clicked on). In one embodiment, the client-side module 174 determines what part of the map a user clicked on by first calling get_all() on the IHTMLDocument2 to get a collection of all HTML elements on the page. Then, the client-side module 174 finds the element with a name that is the name of the map the image is using. Then the client-side module 174 determines the offset x,y of the user's click relative to the upper-left corner of the source element, i.e., the image element. Then the client-side module 174 gets a collection of all AREA elements contained in the MAP. For each AREA element in the collection, the client-side module 174 determines if the X,Y (or coordinates) of the user's click lies within the bounding rectangle described by the AREA's COORDS. Once the client-side module 174 determines which AREA the user clicked on, the client-side module 174 can get the the HREF property.

Returning to the description of method 300, processing proceeds from step 360 to step 330, where the element, including related information such as type and URL, is saved for later use. Processing proceeds from step 330 to step 335, where the next parent element is identified. Then, processing proceeds from step 335 to step 315.

In step 315, the client-side module 174 determines that the current element is not valid if there are no more parent elements. In this case, processing proceeds from step 315 to step 365. In step 365, the client-side module 174 examines the Web page selection indicator to determine if text is selected.

In one embodiment, the client-side module 174 determines if text is selected by getting the IHTMLSelectionObject pointer from the document. If it exists and has the type "text", the text has been selected.

Returning to the description of method 300, processing than proceeds from step 365 to step 370. In step 370, if the client-side module 174 determines that text is selected, processing proceeds to step 375. In step 375, the selected text is saved and the state that the text was selected is also saved. In an embodiment, the client-side module 174 saves the selected text by creating an IHTMLTxtRange for the selection. Then, the client-side module 174 calls get_text( ) on the range to obtain the actual text that is selected. Next, the text and the state that there is TEXT selected are saved for later use. Returning to decision step 370, if there is no text selected the method 300 returns to method 200 at step 245.

Figure 4:
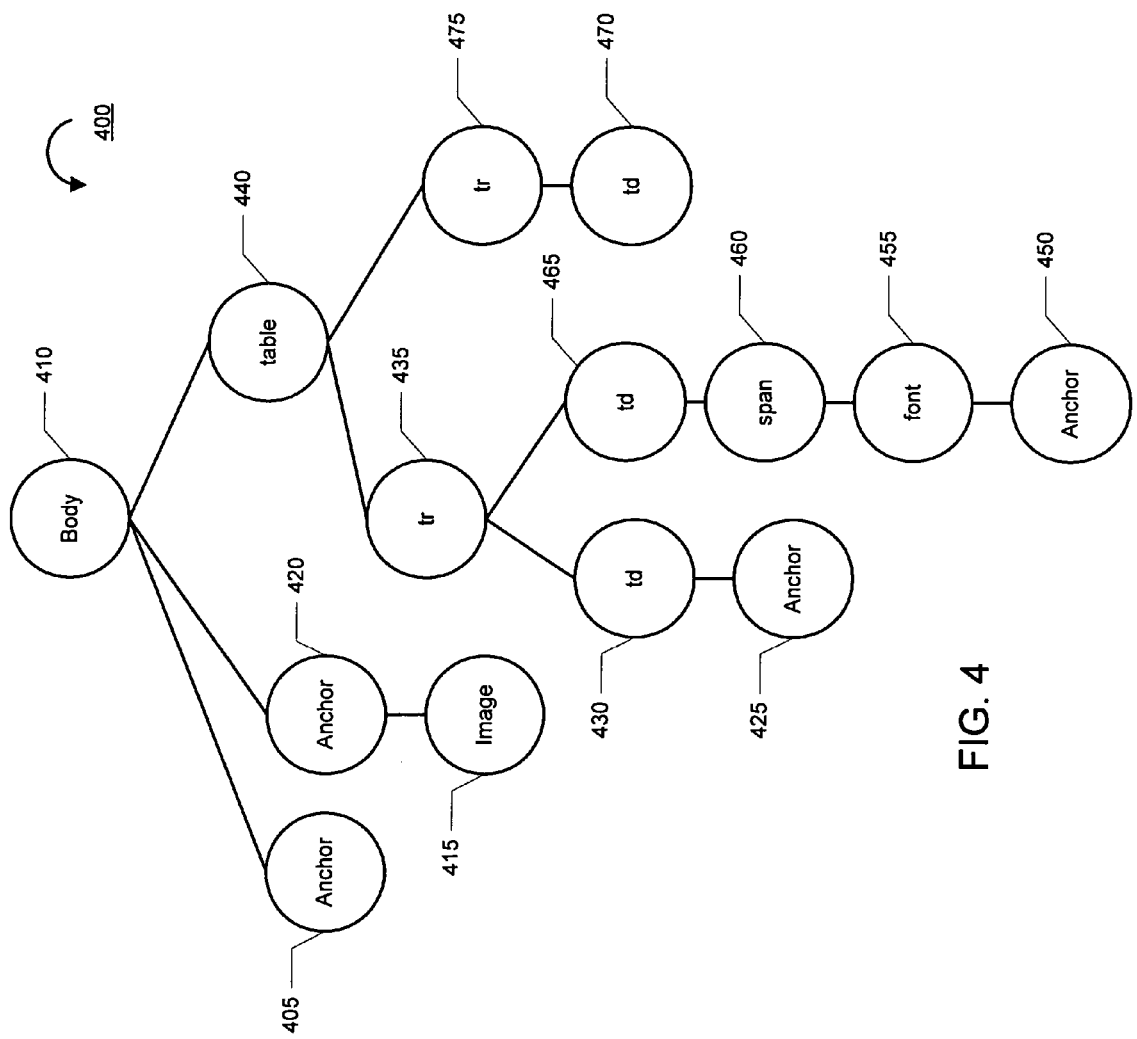
FIG. 4 is a schematic illustrating an exemplary HTML structure.

To further illustrate the method 300 of determining what element is selected by a user, five examples are described below in relation to an exemplary HTML element structure 400, illustrated in FIG. 4. The HTML code (with reference numbers added) that is represented by the structure 400 is as follows:

1—<html>
2—<body>
3—<a href="http://www.yahoo.com/">Yahoo!</a>
4—<br><br>
5—<a href="http://www.yahoo.com/"><img src=img.gif></a>
6—<br><br>
7—<table cellpadding=5 width=100%>
8—<tr bgcolor=red>
9—<td width=50% align=center bgcolor=#00ff00>
10—<a href="http://www.yahoo.com/">Yahoo!</a>
11—</td>
12—<td width=50% align=center bgcolor=#00ffff>
13—<span>
14—<font face=verdana>
15—<a href="http://www.yahoo.com/">Yahoo !</a>
16—</font>
17—</span>
18—</td>
19—</tr>
20—<tr height=25 bgcolor=red>
21—<td>hello</td>
22—</tr>
23—</table>
24—</body>
25—</html>

The first example illustrates a case when a user clicks on a text link. Line 3 of the exemplary HTML code shown above is a text link, and is represented in FIG. 4 by node 405. The element that was selected (clicked on) by the user, i.e., the source element, is an anchor, so it is marked as an anchor and the client-side module 174 walks up the HTML structure to the next parent element. The next parent element is the "body" element, node 410, which, in the present embodiment, is not an element type of interest. Therefore, it is ignored and the next parent element is identified. The next parent element is NULL, so the client-side module 174 proceeds to check if any text was selected. The type clicked on by the user is determined to be ANCHOR.

The second example illustrates the case when a user clicks on an image that is a link. Line 5 of the exemplary HTML code shown above is an image that is a link. It is represented in FIG. 4 by nodes 415 and 420. The element that was clicked on by the user, i.e., the source element, is an image, node 415, so it is marked as an image and the client-side module 174 walks up the HTML structure to the next parent element. The image is not an image map so no extra steps, with respect to the image, are taken. The next parent element is an anchor, node 420, so it is marked as anchor and the next parent element is identified. The next parent element is the "body" element, node 410, which is not an element type of interest. Therefore it is ignored and the next parent element is identified. The next parent element is NULL, so the client-side module 174 proceeds to check if any text was selected. The type clicked on by the user is determined to be ANCHOR and IMAGE.

The third example illustrates the case when a user clicks on a link with a green background. Lines 9 and 10 of the exemplary HTML code shown above is a link with a green background. It is represented in FIG. 4 by nodes 425 and 430. The element that was clicked on by the user, i.e., the source element, is an anchor, node 425, so it is marked as an anchor and the client-side module 174 walks up the HTML structure to the next parent element. The next four parent elements are "td", node 430, "tr", node 435, "table", node 440, and "body", node 410. None of these are element types of interest. Therefore they are ignored and the next parent element is identified. The next parent element is NULL, so the client-side module 174 proceeds to check if any text was selected. The type clicked on by the user is determined to be ANCHOR.

The fourth example illustrates the case when a user clicks on a link with a cyan background. Lines 12 and 18 of the exemplary HTML code shown above is a link with a cyan background. It is represented in FIG. 4 by nodes 450 to 465. The element that was clicked on by the user, i.e., the source element, is an anchor, node 450, so it is marked as an anchor and the client-side module 174 walks up the HTML structure to the next parent element. The next six parent elements are "font", node 455, span, node 460, "td", node 465, "tr", node 435, "table", node 440, and "body", node 410. None of these are element types of interest. Therefore they are ignored and the next parent element is identified. The next parent element is NULL, so the client-side module 174 proceeds to check if any text was selected. The type clicked on by the user is determined to be ANCHOR.

The fifth example illustrates the case when a user clicks on text with a red background. Lines 20 and 22 of the exemplary HTML code shown above is text with a red background. It is represented in FIG. 4 by nodes 470 to 475. The element that was clicked on by the user, i.e., the source element, is "td", node 470, this is not an element of interest so it is ignored. The next three parent elements are "tr", node 475, "table", node 440, and "body", node 410. None of these are element types of interest. Therefore they are ignored and the next parent element is identified. The next parent element is NULL, so the client-side module 174 proceeds to determine if any text was selected. The type clicked on by the user is determined to be NONE.

In alternate embodiments, various other schemes for determining which types of elements are of interest and which are to be ignored may be implemented.

Figure 5:
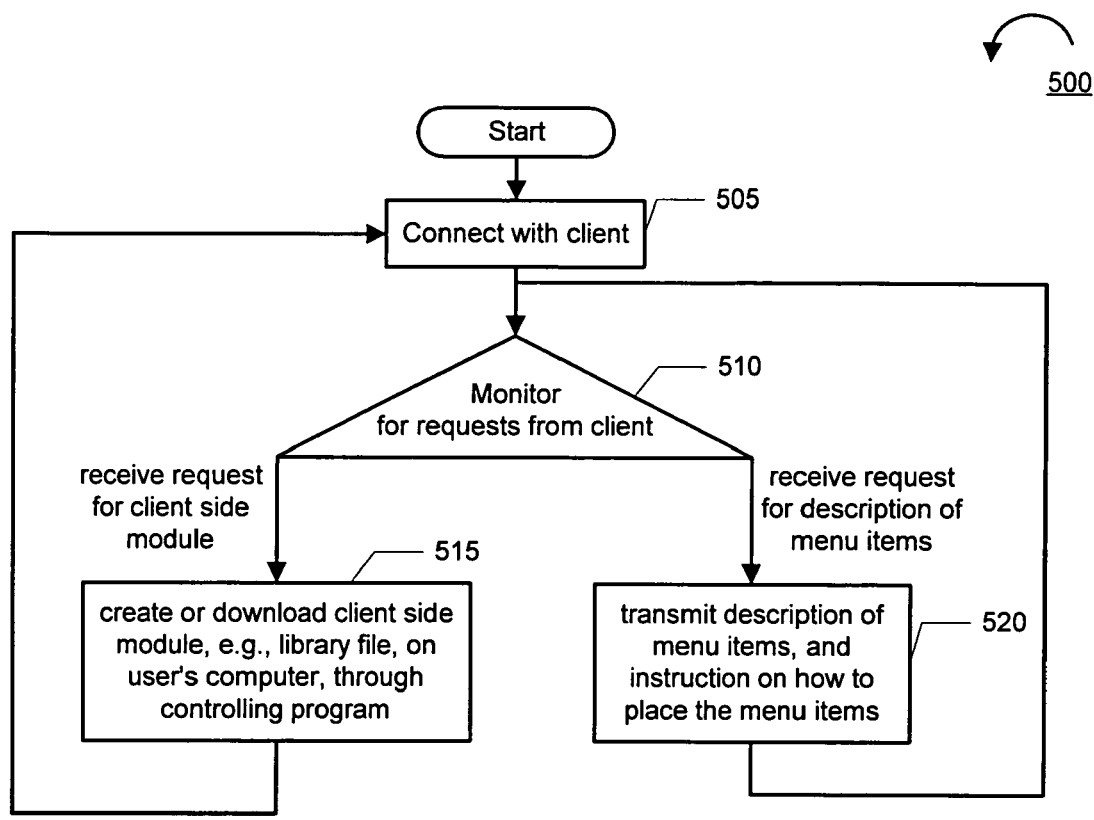
FIG. 5 is a flowchart illustrating the process of providing computer code for controlling a context menu according to an embodiment of the present invention.

FIG. 5 illustrates an exemplary embodiment of the method 500 for providing computer code for controlling a context menu. To use the additional context menu items of the present invention, a user obtains a client-side module 174. In an exemplary embodiment, a user obtains a client-side module 174 by connecting with a predetermined Internet site as in step 505. Then, in step 510, the server monitors for requests from the client. When a request for a client-side module 174 is received, processing proceeds to step 515. In step 515, using the controlling program 122, the Internet site 126 creates or downloads a client-side module 174, to the user's computer 150. The client-side module may be a library file.

Once the client-side module is obtained by the user, processing returns to step 505 where the client-side module 174 connects with a predetermined Internet site. The predetermined Internet site can be Internet site 126, from which client-side module 174 is downloaded, or alternatively, the predetermined Internet site can be another site, e.g., Internet site 136. Processing proceeds to step 510 where the Internet site 126 monitors for requests from the client. When a request for menu descriptions is received, processing proceeds to step 520 where the Internet site transmits the description of the menu items to the client. Then the Internet site 126 returns to step 510, where it monitors for requests from the client.

An embodiment of the invention may be provided as a feature of a method of controlling an Internet browser interface displayable by an Internet browser on a display of a computer, and enabling a user of the computer and Internet browser to access and navigate the Internet and to receive and display on the computer display one or more Web pages from one or more Internet sites, including the display of a Web page from a predetermined Internet site, the Internet browser having at least one Internet browser toolbar having at least one toolbar button providing a predetermined functionality to the user of the computer and Internet browser, the method can comprise, providing, at the predetermined Internet site, access to a program for controlling the Internet browser interface and making available for downloading by the predetermined Internet site, a file for causing the display of a persistent user toolbar adjacent to said Internet browser toolbar so as to create the visual impression that the user toolbar is an integrated part of the Internet browser, the user toolbar making additional functionality that is not part of the Internet browser prior to download available to the user after download as part of the Internet browser interface, such that once the user toolbar is displayed the user toolbar remains displayed and said additional functionality remains available to the user regardless of a subsequent Internet site to which the Internet browser is caused to navigate after download. An Internet user may customize the browser so that each time the user accesses the Internet using the browser, user-defined information and/or functionality will be displayed with the browser interface, e.g., as a toolbar. The toolbar may include bookmarks, address and phone books, personal financial information, personalized news, and various functionality such as is available via ActiveX control and Plug-ins. In addition, if an Internet user has an account with a content provider, that user's specific account information (e.g., investment portfolio, news headlines, bookmarks, address book, additional context menu items etc.) may be dynamically displayed by the browser.

In an embodiment, user specific account information may include personalized context menu items. In such an embodiment, a user can choose which context menu items he or she desires to have, e.g., from a list of provided items. Those preferences can be stored with the content provider and/or locally at the client computer.

In addition, users with accounts can set up and use their additional context menu items in a first location and then have the same context menu settings at a second location without having to re-enter their personal settings. This can be done by storing their context menu settings at the content provider. The personal user settings can then be retrieved from any location the user wants to his or her personalized context menus.

In one exemplary example, wherein the method of controlling a context menu is implemented with a client-side module 174 for a browser toolbar, the description of the menu items are sent down, as a button, in the same feed from the Internet site 126 as the regular buttons for toolbar. This button "qs", which stands for QuickSearch, is marked as invisible so that the normal toolbar bar does not render it. Each menu item is a sub-item of the "qs" button and each item has certain pieces of information, e.g., type, URL, title, and optionally icons, which are downloaded in the background like other toolbar icons, mnemonic keys, a default URL to use if the user is not signed in and starting positions for different click types.

Also optionally sent down in the feed is a value indicating that the context menu feature should be disabled. Using this value, it is possible to turn this feature off, e.g., if there are complications or problems while implementing control of the context menu.

In addition, by having the additional context menu items described in the toolbar feed, different choices for different countries or users can be implemented. Furthermore, it is possible to dynamically add new items without requiring the user to download a new client-side module 174. The description of the "qs" button is stored on the client computer 150 using the caching mechanisms of the client-side module 174, so the user only has to download a new context menu item description if the items have changed.

An embodiment can also be implemented with information stored on the user (or client) computer. For example, context menu items can be stored on the client computer. When a user calls for a context menu, these stored context menu items are added to the displayed context menu. In addition, information stored on a client computer by other applications may be used to add additional features to the invention. For example, information such as partner code, cobrands and the location at which a user downloads the invention, may be stored on a client's computer. This stored information can be used to determine the contents of the context menu. In an embodiment, a registry would be examined to determine which context menu items to use. In another example, one menu item can be, "email this link to . . . ." Floating a mouse pointer over and/or selecting this item, creates a submenu including addresses from another application, e.g., Outlook. Additional features can also be implemented in accordance with the invention by adding additional computer code, e.g., plugins.

Figure 6:
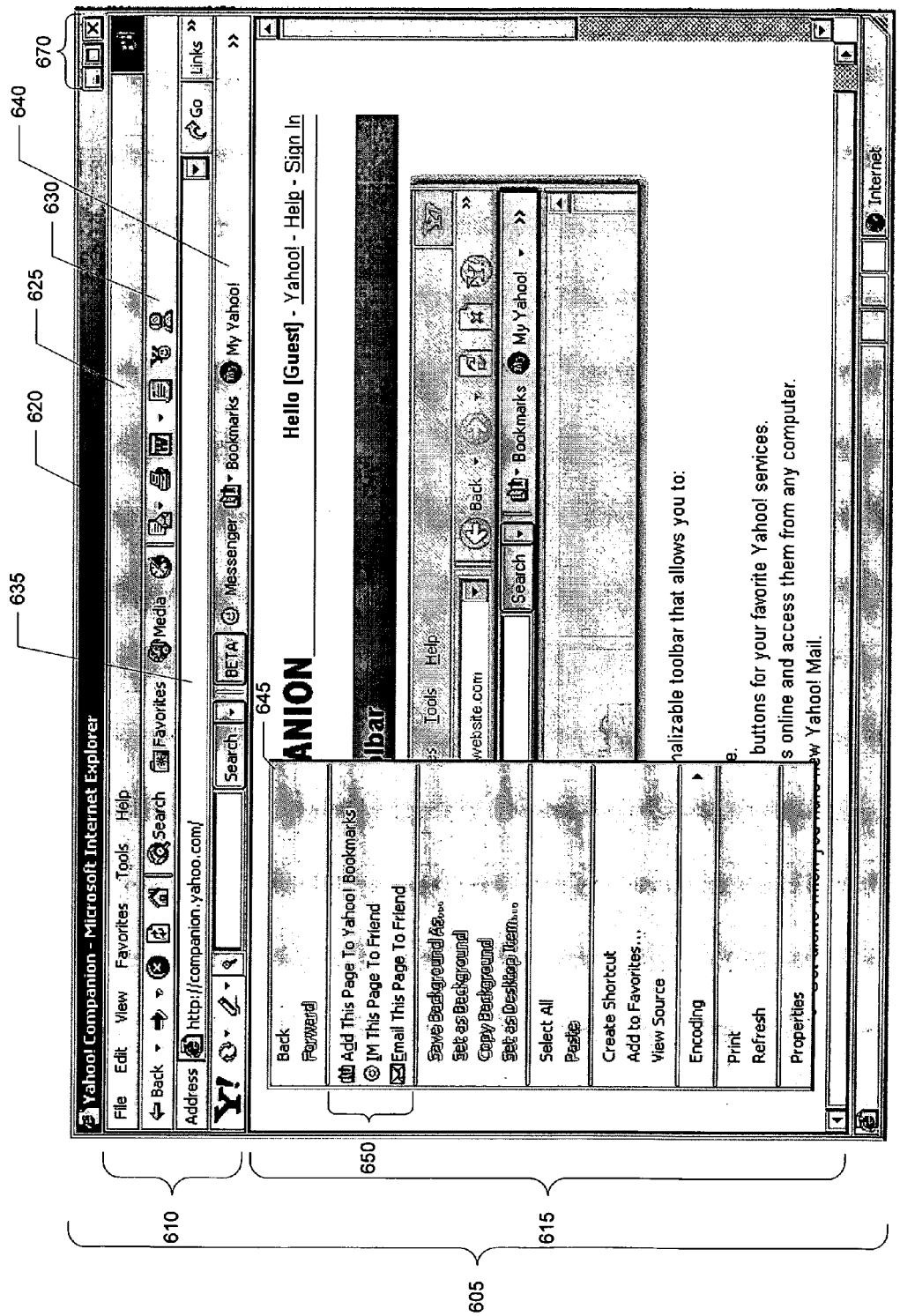
FIG. 6 is an exemplary screen shot illustrating an exemplary context menu, according to an embodiment of the present invention.

FIGS. 6-9 illustrate exemplary context menus for different clicked elements, implemented according to one embodiment of the invention. Referring to FIG. 6, browser 600 is a browser implemented according to one embodiment of the present invention. Browser 600 includes a plurality of windows, each providing various functionality to the Internet user. The browser 600 may comprise a first application window 605 that typically defines the general size, color, and layout of the browser 600 and includes window control buttons 670 (e.g., minimize, close, etc.) for that application window 605. The browser 600 may also comprise a browser window 615 and toolbar windows 610. The browser window 615 and the toolbar windows 610 typically define information and/or functionality that will assist an Internet user when accessing and navigating the Internet. For example, the browser window 615 and the toolbar windows 610 may provide toolbars, pull-down menus, Plug-ins, applications, etc.

For example, the toolbar windows 610 provided at the top (see FIG. 6) of the application window 605 define four toolbars 625, 630, 635, 640, which may include a variety of interface controls such as, for example, pull-down menus, functional buttons (e.g., stop, back, forward, home, etc.), and a combination of functional buttons and windows (e.g., a search button and window). The upper most toolbar 625 provides a plurality of pull-down menus; the second toolbar from the top 630 provides a plurality of functional buttons; the third toolbar from the top 635 provides a pull-down menu and a window, e.g., a URL address window; the bottom most toolbar 640 is implemented by the client-side module 174 and provides added functionality to the browser such as a search field and the context menu of the present invention. In an embodiment of the invention the context menu items descriptions may be included with the bottom most toolbar 640 as an invisible button. A browser window 615 is also provided as part of the browser 600 within which content from an Internet content provider 120 (see FIG. 1) may be displayed.

A user can call a context menu by, for example, right clicking on a mouse button. In FIG. 6, a user has right clicked while the pointer was on the background of the Web page, calling context menu 645. In this exemplary embodiment, the invention adds context menu items 650 based on the user clicking the background. The items were placed as the second set of menu items, and include icons and mnemonic keys. The context menu items include, "Add This Page To Yahoo! Bookmarks,". "IM this Page To Friend", and "Email This Page to Friend". As mentioned above, these menu items may be modified through the context menu items description.

Figure 7:
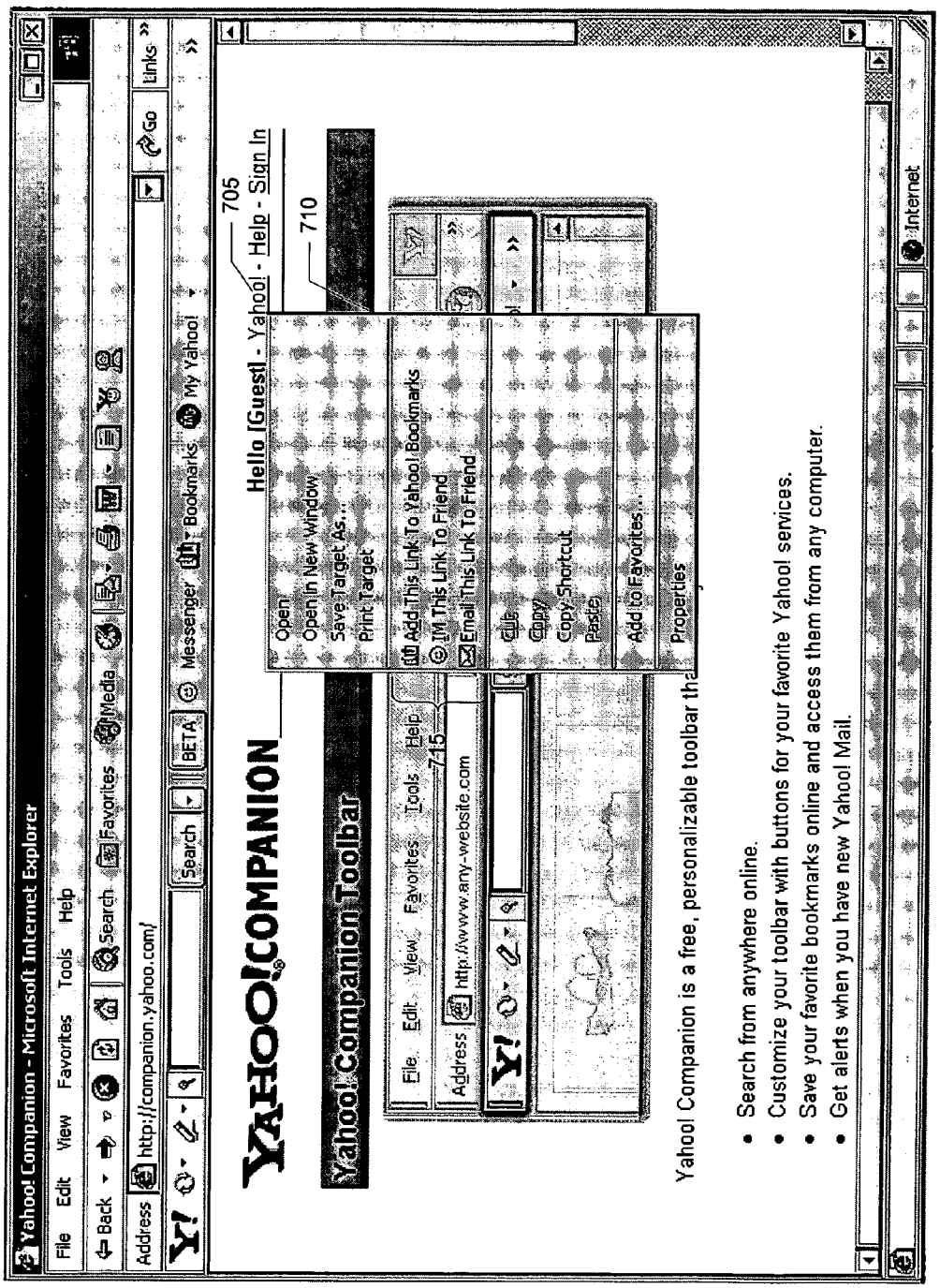
FIG. 7 is an exemplary screen shot illustrating another exemplary context menu, according to an embodiment of the present invention.

In FIG. 7, a user has right clicked while the pointer was on the text link "Yahoo!" 705, calling context menu 710. In this exemplary embodiment, the embodiment adds context menu items 715 based on the user clicking "Yahoo!" 705. The items were placed as the second set of menu items, and include icons and mnemonic keys. The context menu items include, "Add This Link To Yahoo! Bookmarks," "IM this Link To Friend," and "Email This Link to Friend." These context menu items are different from the previous example.

Figure 8:
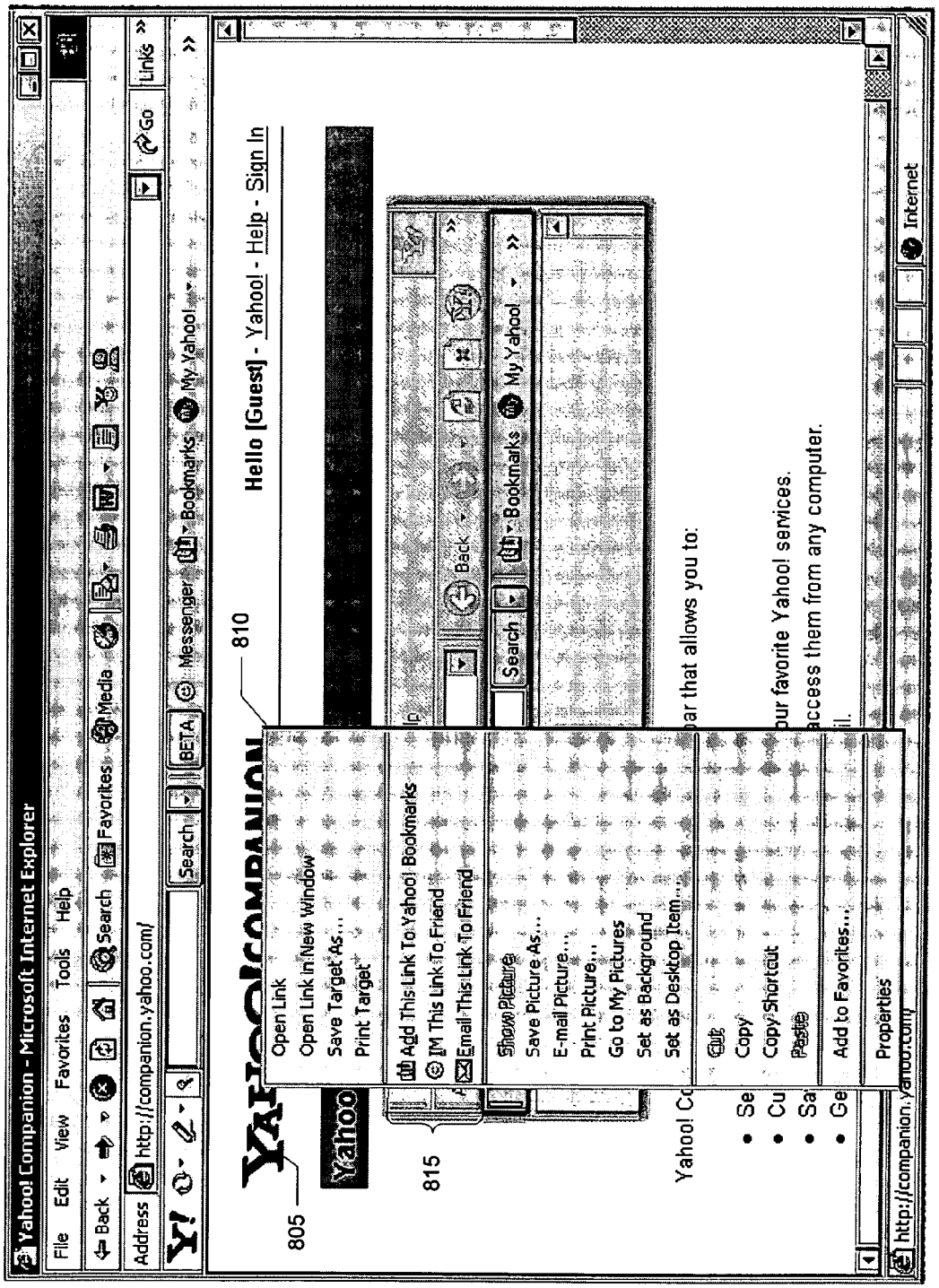
FIG. 8 is an exemplary screen shot illustrating another exemplary context menu, according to an embodiment of the present invention.

In FIG. 8, a user has right clicked while the pointer was on the image link "Yahoo!Companion" 805, calling context menu 810. In this exemplary embodiment, the present invention adds context menu items 815 based on the user clicking "Yahoo!Companion" 805. The items were placed as the second set of menu items, and include icons and mnemonic keys. The context menu items include, "Add This Link To Yahoo! Bookmarks," "IM this Link To Friend," and "Email This Link to Friend."

Figure 9:
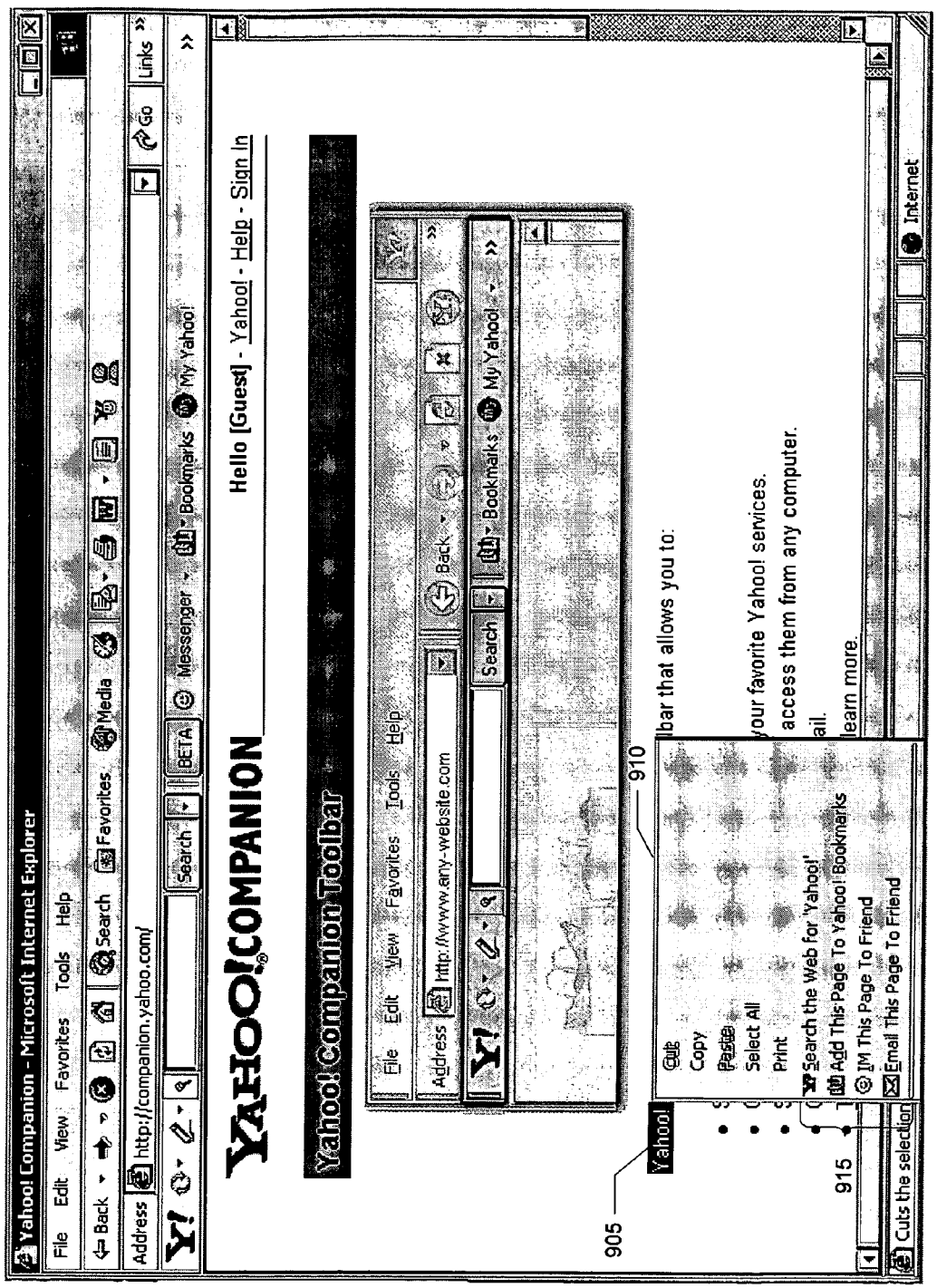
FIG. 9 is an exemplary screen shot illustrating another exemplary context menu, according to an embodiment of the present invention.

In FIG. 9, a user has right clicked on the background while the text "Yahoo!" 905 was highlighted, calling context menu 910. In this exemplary embodiment, the present invention adds context menu items 915 based on the highlighted text and based on the user right clicking on the background. The items were placed as the second set of menu items, and include icons and mnemonic keys. The context menu items include, "Search the Web for Yahoo!," "Add This Page To Yahoo! Bookmarks," "IM this Page To Friend," and "Email This Page to Friend." If the "Yahoo!" 905 was highlighted and the user right clicked over a link, the context menu items would include "Add This Link To Yahoo! Bookmarks," "IM this Link To Friend," and "Email This Link to Friend" and "Search the Web for Yahoo!" (Not Shown).

Alternatively, the methods and system of controlling a context menu of the present invention can be implemented outside of the browser environment. The context menus used with the operating system of a computer and other applications, e.g., Microsoft Office, can be controlled in a similar way. For example, additional menu items can be added to the Windows start menu and the context menu called when a user right clicks or otherwise make a selection on the desktop, or the taskbar. Furthermore, additional menu items may be added to the right click menu used for Microsoft Word.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed:

1. A method comprising:
modifying an existing context menu in existing software via a client-side software module comprising additional menu information, the client-side software module executing on a computer having a display;
detecting an event that calls for display of the existing context menu by the existing software;
after detecting the event and in response to the event, modifying the existing context menu based on the additional menu information; and
subsequently displaying, by the computer, the modified context menu, such that
the existing context menu is not displayed in response to said event, and
the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

2. The method of claim 1, the existing context menu comprising at least one existing menu item, the additional menu item being positioned above the existing menu item in the modified context menu.

3. The method of claim 1, wherein the modified context menu comprises an icon displayed with the additional menu item.

4. The method of claim 1, wherein the additional menu information comprises information related to an icon to be associated with the additional menu item.

5. The method of claim 1, wherein the additional menu item comprises at least one sub menu that comprises at least one additional sub menu item.

6. The method of claim 1, wherein the client-side software module is provided to a user computer, the user computer displaying a Web page, the Web page being divided into regions, the method further comprising determining in what region the user is interacting with the Web page when the event occurs.

7. The method of claim 6, further comprising selecting for display the additional menu item from a plurality of potential menu items based on the determined region.

8. The method of claim 1, wherein the client-side software module is provided to a user computer, the user computer displaying a user interface, the method further comprising determining a location of the user interface at which the user is interacting with the user interface when the event occurs.

9. The method of claim 8, further comprising selecting for display the additional menu item from a plurality of potential menu items based on the determined region.

10. The method of claim 1, wherein the client-side software module is provided to a user computer, the user computer displaying a user interface, the user interface comprising a plurality of elements, the method further comprising determining which element of the plurality of elements the user is interacting with when the event occurs.

11. The method of claim 10, further comprising selecting for display the additional menu item from a plurality of potential menu items based on the determined element.

12. The method of claim 1, further comprising selecting for display the additional menu item from a plurality of potential menu items based on the location of a user computer to which the client-side software module is provided.

13. The method of claim 1, wherein the client-side software module is provided to a user computer, the user computer displaying a Web page, the Web page comprising a plurality of elements, the method further comprising determining which element of the plurality of elements the user is interacting with when the event occurs.

14. The method of claim 13, further comprising selecting for display the additional menu item from a plurality of potential menu items based on the determined element.

15. The method of claim 13, wherein determining which element the user is interacting with comprises:
   identifying an element from the plurality of elements that comprise an HTML structure;
   determining a type of the element;
   saving information related to the element;
   determining when the user has selected text; and
   saving the selected text.

16. The method of claim 15 wherein identifying an element from the plurality of elements that make up the HTML structure, determining the type of the element, and saving information related to the element are repeated for elements above a first identified element in the HTML structure until an element above the first identified element is no longer valid.

17. The method of claim 15, wherein the additional menu item is configured based on the saved information related to the element and the saved text.

18. The method of claim 1, further comprising, prior to modifying the existing context menu, obtaining information related to the existing context menu.

19. The method of claim 18, wherein the obtaining comprises subclassing a browser window.

20. The method of claim 1, wherein the client-side software module comprises a control that operates with the browser.

21. The method of claim 20, wherein the control is implemented using an ActiveX control.

22. The method of claim 1, further comprising providing the additional menu item as part of a general feed including button characteristics of a plurality of buttons for a downloadable toolbar, wherein the downloadable toolbar receives the additional menu item as a button that is not displayed.

23. The method of claim 22, wherein the providing of the additional menu item is performed by a server.

24. The method of claim 1, the modifying the existing context menu comprising adding the additional menu item to the existing context menu using an application programming interface.

25. The method of claim 1, wherein an Internet content provider maintains for a user a user account comprising user account information, and the modified context menu is configured based on the user account information.

26. The method of claim 25, further comprising selecting for display the additional menu item from a plurality of potential menu items based on the user account information.

27. The method of claim 25, further comprising providing the user with the ability to log in to the content provider.

28. The method of claim 27, wherein the selecting for display the additional menu item is determined by the content provider based upon the user account information such that the selection of the additional menu item is personalized in accordance with preferences of the user.

29. The method of claim 28, wherein the user account information is maintained by the content provider, independent of a first computer having a first browser that the user utilizes, such that the selection of the additional menu item remains personalized when the user utilizes a second computer having a second browser.

30. The method of claim 29, wherein the personalization of the selection of the additional menu item is based upon the location of the first computer, when the user utilizes the first computer, and is based upon the location of the second computer, when the user utilizes the second computer, such that the selection of the additional menu item is modified based upon a location of a computer utilized by the user.

31. The method of claim 1, wherein the modified context menu is configured based on a detected location at which the user is utilizing the existing software.

32. A method comprising:
   controlling an Internet browser user interface displayable by an Internet browser on a display of a computer, and enabling a user of the computer and Internet browser to access and navigate the Internet and to receive and display one or more Web pages from one or more Internet sites, including the display of a Web page from a predetermined Internet site, the Internet browser having at least one Internet browser toolbar having at least one toolbar button providing predetermined functionality to the user of the computer and Internet browser, the method comprising:
   providing, by a server and at the predetermined Internet site, access to a client-side software module for controlling the Internet browser interface; and
   making available for downloading by the predetermined Internet site the client-side software module for causing the display of a user toolbar that, by virtue of its being downloaded, makes additional functionality that is not part of the Internet browser prior to download available to the user after download, such that once the user toolbar is displayed the user toolbar remains displayed and the additional functionality remains available to the user regardless of a subsequent Internet site to which the Internet browser is caused to navigate after download;
   the client-side software module being configured for:
   detecting an event that calls for display of a context menu by existing software;
   after detecting the event and in response to the event, modifying the existing context menu based on additional menu information; and
   subsequently displaying the modified context menu, such that
   the existing context menu is not displayed in response to said event, and
   the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

33. A method comprising:
   providing, by a server and at a predetermined Internet site, access to a program for controlling the Internet browser interface and making available for downloading by the predetermined Internet site, a file for causing the display of a persistent user toolbar on a computing device, the user toolbar making additional functionality that is not part of the Internet browser prior to download available to the user after download as part of the Internet browser interface, the additional functionality comprising:

detecting an event that calls for display of an existing context menu by existing software;

after detecting the event and in response to the event, modifying the existing context menu based on the additional menu information; and subsequently displaying the modified context menu, such that the existing context menu is not displayed in response to said event, and the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

34. A computer-readable storage medium tangibly comprising a software module that when executed performs a method comprising:

detecting an event that calls for display of a context menu by existing software;

after detecting the event and in response to the event, modifying an existing context menu based on additional menu information; and subsequently displaying the modified context menu, such that the existing context menu is not displayed in response to said event, and the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

35. The computer-readable storage medium of claim 34, the existing context menu comprising at least one existing menu item, the additional menu item being positioned above the existing menu item in the modified context menu.

36. The computer-readable storage medium of claim 34, wherein the modified context menu comprises an icon displayed with the additional menu item.

37. The computer-readable storage medium of claim 34, wherein the additional menu information comprises information related to an icon to be associated with the additional menu item.

38. The computer-readable storage medium of claim 34, wherein the additional menu item comprises at least one sub menu that comprises at least one additional sub menu item.

39. The computer-readable storage medium of claim 34, wherein the software module is a client-side software module provided to a user computer, the user computer displaying a Web page, the Web page being divided into regions, the method further comprising determining in what region the user is interacting with the Web page when the event occurs.

40. The computer-readable storage medium of claim 39, the method performed by the computer further comprising selecting for display the additional menu item from a plurality of potential menu items based on the determined region.

41. The computer-readable storage medium of claim 34, wherein the software module is a client-side software module provided to a user computer, the user computer displaying a Web page, the Web page comprising a plurality of elements, the method performed by the computer further comprising determining which element of the plurality of elements the user is interacting with when the event occurs.

42. The computer-readable storage medium of claim 41, the method performed by the computer further comprising selecting for display the additional menu item from a plurality of potential menu items based on the determined element.

43. The computer-readable storage medium of claim 41, wherein, in the method performed by the computer, determining which element the user is interacting with comprises:

identifying an element from the plurality of elements that comprise an HTML structure;

determining a type of the element;

saving information related to the element;

determining when the user has selected text; and saving the selected text.

44. The computer-readable storage medium of claim 43, wherein, in the method performed by the computer, identifying an element from the plurality of elements that make up the HTML structure, determining the type of the element, and saving information related to the element are repeated for elements above a first identified element in the HTML structure until an element above the first identified element is no longer valid.

45. A system comprising:

one or more servers configured for:

providing a client-side software module for modifying an existing context menu in existing software, the client-side software module comprising additional menu information, the client-side software module being configured for:

detecting an event that calls for display of the existing context menu by the existing software;

after detecting the event and in response to the event, modifying the existing context menu based on the additional menu information; and subsequently displaying the modified context menu, such that the existing context menu is not displayed in response to said event, and the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

46. The system of claim 45, the existing context menu comprising at least one existing menu item, the additional menu item being positioned above the existing menu item in the modified context menu.

47. The system of claim 45, wherein the modified context menu comprises an icon displayed with the additional menu item.

48. The system of claim 45, wherein the additional menu information comprises information related to an icon to be associated with the additional menu item.

49. The system of claim 45, wherein the additional menu item comprises at least one sub menu that comprises at least one additional sub menu item.

50. The system of claim 45, wherein the client-side software module is provided to a user computer, the user computer displaying a Web page, the Web page being divided into regions, the method further comprising determining in what region the user is interacting with the Web page when the event occurs.

51. The system of claim 50, the client-side software module being further configured for selecting for display the additional menu item from a plurality of potential menu items based on the determined region.

52. The system of claim 45, wherein the client-side software module is provided to a user computer, the user computer displaying a Web page, the Web page comprising a plurality of elements, the servers being further configured for determining which element of the plurality of elements the user is interacting with when the event occurs.

53. The system of claim 52, the client-side software module being further configured for selecting for display the additional menu item from a plurality of potential menu items based on the determined element.

54. The system of claim 52, wherein determining which element the user is interacting with comprises:
identifying an element from the plurality of elements that comprise an HTML structure;
determining a type of the element;
saving information related to the element;
determining when the user has selected text; and
saving the selected text.

55. The system of claim 54, wherein identifying an element from the plurality of elements that make up the HTML structure, determining the type of the element, and saving information related to the element are repeated for elements above a first identified element in the HTML structure until an element above the first identified element is no longer valid.

56. A method comprising:
providing, by a computing system to a user computer displaying a Web page comprising a plurality of elements, a client-side software module for modifying an existing context menu in existing software, the existing context menu comprising at least one existing menu item, the client-side software module comprising additional menu information, the client-side software module being configured for:
detecting an event that calls for display of the existing context menu by the existing software;
after detecting the event and in response to the event, modifying the existing context menu based on the additional menu information;
subsequently displaying the modified context menu such that,
the existing context menu is not displayed in response to said event, and
the modified context menu is different from the existing context menu, the modified context menu comprising an additional menu item as part of the context menu, the additional menu item being positioned relative to the existing menu item within the modified context menu based on the additional menu information and not in accordance with the existing software, said additional menu item not being present within the existing context menu prior to modification, and wherein the modified context menu comprises an icon displayed with the additional menu item;
identifying an element from the plurality of elements that comprise an HTML structure;
determining a type of the element;
saving information related to the element;
determining when the user has selected text; and
saving the selected text;
wherein identifying an element from the plurality of elements that make up the HTML structure, determining the type of the element, and saving information related to the element are repeated for elements above a first identified element in the HTML structure until an element above the first identified element is no longer valid and wherein the additional menu item is configured based on the saved information related to the element and the saved text.

57. A method comprising:
providing the user with the ability to log in to an Internet content provider;
maintaining for the user a user account comprising user account information,
providing, by a computing system, a client-side software module for modifying an existing context menu in existing software, the client-side software module comprising additional menu information and being configured for:
detecting an event that calls for display of a context menu by the existing software;
after detecting the event and in response to the event, modifying the existing content menu based on the additional menu information;
selecting for display the additional menu item from a plurality of potential menu items based on the user account information such that the selection is personalized in accordance with preferences of the user; and
subsequently displaying the modified context menu; wherein,
the existing context menu is not displayed in response to said event, and
the modified context menu is different from the existing context menu, the modified context menu comprising an additional menu item as pan of the context menu, the additional menu item being positioned within the modified context menu based on the additional menu information and not in accordance with existing software, said additional menu item not being present within the existing context menu prior to modification; and
wherein the user account information is maintained by the content provider, independent of a first computer having a first browser that the user utilizes, such that the selection of the additional menu item remains personalized should the user utilize a second computer having a second browser.

58. A method comprising:
accessing additional menu information;
detecting an event that requires display of a context menu by existing software via a client-side software module executing on a computer;
after detecting the event and in response to the event modifying the existing context menu based on the additional menu information; and
displaying the modified context menu;
wherein the modified context menu is different from the existing context menu, the modified context menu comprising an additional menu item as part of the context menu, the additional menu item being positioned within the modified context menu based on the additional menu information and not in accordance with the existing software, said additional menu item not being present within the existing context menu prior to modification.

59. The method of claim 58, the existing context menu comprising at least one existing menu item, the additional menu item being positioned above the existing menu item in the modified context menu.

60. The method of claim 58, wherein the modified context menu comprises an icon displayed with the additional menu item.

61. The computer-readable medium of claim 34, wherein the code is part of a downloadable toolbar application.

* * * * *